US008952858B2

(12) United States Patent
de Rochemont

(10) Patent No.: US 8,952,858 B2
(45) Date of Patent: Feb. 10, 2015

(54) FREQUENCY-SELECTIVE DIPOLE ANTENNAS

(76) Inventor: L. Pierre de Rochemont, Austin, TX (US)

( * ) Notice: Subject to any disclaimer, the term of this patent is extended or adjusted under 35 U.S.C. 154(b) by 477 days.

(21) Appl. No.: 13/163,654

(22) Filed: Jun. 17, 2011

(65) Prior Publication Data

US 2011/0248900 A1 Oct. 13, 2011

Related U.S. Application Data

(63) Continuation-in-part of application No. 12/818,025, filed on Jun. 17, 2010.

(60) Provisional application No. 61/355,755, filed on Jun. 17, 2010, provisional application No. 61/187,687, filed on Jun. 17, 2009.

(51) Int. Cl.
*H01G 9/26* (2006.01)
*H01Q 9/26* (2006.01)

(52) U.S. Cl.
CPC .......................................... *H01Q 9/26* (2013.01)
USPC .......................................... 343/803; 343/795

(58) Field of Classification Search
CPC ............. H01Q 9/26; H01Q 1/38; H01Q 9/06; H01Q 9/065
USPC .................................. 343/803, 795, 793, 820
See application file for complete search history.

(56) References Cited

U.S. PATENT DOCUMENTS 2,283,925 A 5/1942 Harvey
2,886,529 A 5/1959 Louis
(Continued)

FOREIGN PATENT DOCUMENTS

EP 0026056 A1 4/1981
EP 0939451 A1 1/1999
(Continued)

OTHER PUBLICATIONS

Andrenko, A.S. et al. EM Analysis of PBG Substrate Microstrip Circuits for Integrated Transmitter Front End. MMET 2000 Proceedings pp. 295-297.

(Continued)

*Primary Examiner* — Hoanganh Le

(74) *Attorney, Agent, or Firm* — Burns & Levinson LLP; Jacob N. Erlich; David W. Gomes

(57) ABSTRACT

A dipole antenna provides electrical dipole conductors folded to form distributed inductive and/or capacitive reactive loads between selected portions of one or more coupled line segments of the individual dipole conductors or between one dipole conductor to another, wherein the electrical dipole conductors form a selective frequency filter. An antenna provides a substrate, electrical conductors formed on and/or in the substrate, and one or more ceramic dielectric elements having relative permittivity $\epsilon_R \geq 10$ and/or relative permeability $\mu_R \geq 10$ formed on and/or in the substrate between selected portions of the electrical conductors for determining a distributed reactance within the selected portions. A folded dipole antenna provides conducting dipole arms, a distributed network filter having distributed reactance within and between the conducting dipole arms, and a tunable reactance connected to an input of the distributed network filter for adjusting a resonant frequency of the antenna.

11 Claims, 25 Drawing Sheets

(56) References Cited

U.S. PATENT DOCUMENTS

| | | | |
|---|---|---|---|
| 3,574,114 | A | 4/1971 | Monforte |
| 3,614,554 | A | 10/1971 | Shield et al. |
| 3,983,077 | A | 9/1976 | Fuller et al. |
| 4,400,683 | A | 8/1983 | Eda et al. |
| 4,455,545 | A | 6/1984 | Shelly |
| 4,523,170 | A | 6/1985 | Huth, III |
| 4,646,038 | A | 2/1987 | Wanat |
| 4,759,120 | A | 7/1988 | Bernstein |
| 4,859,492 | A | 8/1989 | Rogers, Jr. et al. |
| 4,880,770 | A | 11/1989 | Mir et al. |
| 4,967,201 | A | 10/1990 | Rich, III |
| 5,084,749 | A | 1/1992 | Losee et al. |
| 5,130,675 | A | 7/1992 | Sugawara |
| 5,139,999 | A | 8/1992 | Gordan et al. |
| 5,154,973 | A | 10/1992 | Imagawa et al. |
| 5,198,824 | A | 3/1993 | Poradish |
| 5,217,754 | A | 6/1993 | Santiago-Aviles et al. |
| 5,219,377 | A | 6/1993 | Poradish |
| 5,263,198 | A | 11/1993 | Geddes et al. |
| 5,272,485 | A | 12/1993 | Mason et al. |
| 5,403,797 | A | 4/1995 | Ohtani et al. |
| 5,427,988 | A | 6/1995 | Sengupta et al. |
| 5,456,945 | A | 10/1995 | McMillan et al. |
| 5,478,610 | A | 12/1995 | Desu et al. |
| 5,513,382 | A | 4/1996 | Agahi-Kesheh et al. |
| 5,535,445 | A | 7/1996 | Gunton |
| 5,540,772 | A | 7/1996 | McMillan et al. |
| 5,543,773 | A | 8/1996 | Evans et al. |
| 5,584,053 | A | 12/1996 | Kommrusch et al. |
| 5,590,387 | A | 12/1996 | Schmidt et al. |
| 5,614,252 | A | 3/1997 | McMillan et al. |
| 5,625,365 | A | 4/1997 | Tom et al. |
| 5,635,433 | A | 6/1997 | Sengupta |
| 5,707,459 | A | 1/1998 | Itoyama et al. |
| 5,707,715 | A | 1/1998 | deRochemont et al. |
| 5,747,870 | A | 5/1998 | Pedder |
| 5,759,923 | A | 6/1998 | McMillan et al. |
| 5,764,189 | A | 6/1998 | Lohninger |
| 5,771,567 | A | 6/1998 | Pierce et al. |
| 5,854,608 | A | 12/1998 | Leisten |
| 5,859,621 | A | 1/1999 | Leisten |
| 5,888,583 | A | 3/1999 | McMillan et al. |
| 5,889,459 | A | 3/1999 | Hattori et al. |
| 5,892,489 | A | 4/1999 | Kanba et al. |
| 5,903,421 | A | 5/1999 | Furutani et al. |
| 5,933,121 | A | 8/1999 | Rainhart et al. |
| 5,945,963 | A | 8/1999 | Leisten |
| 6,023,251 | A | 2/2000 | Koo et al. |
| 6,027,826 | A | 2/2000 | deRochemont |
| 6,028,568 | A | 2/2000 | Asakura et al. |
| 6,031,445 | A | 2/2000 | Marty et al. |
| 6,040,805 | A | 3/2000 | Huynh et al. |
| 6,046,707 | A | 4/2000 | Gaughan et al. |
| 6,052,040 | A | 4/2000 | Hino |
| 6,111,544 | A | 8/2000 | Dakeya et al. |
| 6,143,432 | A | 11/2000 | deRochemont et al. |
| 6,154,176 | A | 11/2000 | Fathy et al. |
| 6,176,004 | B1 | 1/2001 | Rainhart et al. |
| 6,181,297 | B1 | 1/2001 | Leisten |
| 6,188,368 | B1 | 2/2001 | Koriyama et al. |
| 6,195,049 | B1 | 2/2001 | Kim et al. |
| 6,204,203 | B1 | 3/2001 | Narwankar et al. |
| 6,208,843 | B1 | 3/2001 | Huang et al. |
| 6,222,489 | B1 | 4/2001 | Tsuru et al. |
| 6,266,020 | B1 | 7/2001 | Chang |
| 6,271,803 | B1 | 8/2001 | Watanabe et al. |
| 6,300,894 | B1 | 10/2001 | Lynch et al. |
| 6,320,547 | B1 | 11/2001 | Fathy et al. |
| 6,323,549 | B1 | 11/2001 | deRochemont et al. |
| 6,492,949 | B1 | 12/2002 | Breglia et al. |
| 6,496,149 | B1 | 12/2002 | Birnbaum et al. |
| 6,501,415 | B1 | 12/2002 | Viana et al. |
| 6,541,820 | B1 | 4/2003 | Bol |
| 6,552,693 | B1 | 4/2003 | Leisten |
| 6,559,735 | B1 | 5/2003 | Hoang et al. |
| 6,583,699 | B2 | 6/2003 | Yokoyama |
| 6,605,151 | B1 | 8/2003 | Wessels et al. |
| 6,611,419 | B1 | 8/2003 | Chakravorty |
| 6,620,750 | B2 | 9/2003 | Kim et al. |
| 6,639,556 | B2 | 10/2003 | Baba |
| 6,642,908 | B2 | 11/2003 | Pleva et al. |
| 6,650,303 | B2 | 11/2003 | Yoon et al. |
| 6,670,497 | B2 | 12/2003 | Tashino et al. |
| 6,680,700 | B2 | 1/2004 | Hilgers |
| 6,683,576 | B2 | 1/2004 | Achim |
| 6,686,406 | B2 | 2/2004 | Tomomatsu et al. |
| 6,690,336 | B1 | 2/2004 | Leisten et al. |
| 6,697,605 | B1 | 2/2004 | Atokawa et al. |
| 6,742,249 | B2 | 6/2004 | deRochemont et al. |
| 6,743,744 | B1 | 6/2004 | Kim et al. |
| 6,762,237 | B2 | 7/2004 | Glatkowski et al. |
| 6,791,496 | B1 | 9/2004 | Killen et al. |
| 6,864,848 | B2 | 3/2005 | Sievenpiper |
| 6,906,674 | B2 | 6/2005 | McKinzie, III et al. |
| 6,919,119 | B2 | 7/2005 | Kalkan et al. |
| 7,047,637 | B2 | 5/2006 | deRochemont et al. |
| 7,405,698 | B2 | 7/2008 | deRochemont |
| 7,564,887 | B2 | 7/2009 | Wang et al. |
| 7,714,794 | B2 * | 5/2010 | Tavassoli Hozouri ........ 343/795 |
| 7,763,917 | B2 | 7/2010 | deRochemont |
| 8,193,873 | B2 * | 6/2012 | Kato et al. .................. 333/24 R |
| 2001/0023779 | A1 | 9/2001 | Sugaya et al. |
| 2001/0027119 | A1 | 10/2001 | Furutani et al. |
| 2001/0048969 | A1 | 12/2001 | Constantino et al. |
| 2002/0039667 | A1 | 4/2002 | Takaya et al. |
| 2002/0047768 | A1 | 4/2002 | Duffy |
| 2002/0070983 | A1 | 6/2002 | Kozub et al. |
| 2002/0092472 | A1 | 7/2002 | Hayashi et al. |
| 2002/0110004 | A1 | 8/2002 | Parks |
| 2002/0171591 | A1 * | 11/2002 | Beard ........................... 343/702 |
| 2002/0190818 | A1 | 12/2002 | Endou et al. |
| 2003/0002045 | A1 | 1/2003 | Nemat-Nasser et al. |
| 2003/0034124 | A1 | 2/2003 | Sugaya et al. |
| 2003/0073565 | A1 | 4/2003 | Ellis et al. |
| 2003/0080325 | A1 | 5/2003 | Uchiyama et al. |
| 2003/0107455 | A1 | 6/2003 | Imanaka et al. |
| 2003/0111714 | A1 | 6/2003 | Bates et al. |
| 2003/0122647 | A1 | 7/2003 | Ou |
| 2003/0148024 | A1 | 8/2003 | Kodas et al. |
| 2003/0161959 | A1 | 8/2003 | Kodas et al. |
| 2003/0170436 | A1 | 9/2003 | Sumi et al. |
| 2003/0221621 | A1 | 12/2003 | Pokharna et al. |
| 2004/0000964 | A1 | 1/2004 | Killen et al. |
| 2004/0000966 | A1 | 1/2004 | Killen et al. |
| 2004/0000970 | A1 | 1/2004 | Killen et al. |
| 2004/0000972 | A1 | 1/2004 | Killen et al. |
| 2004/0000975 | A1 | 1/2004 | Killen et al. |
| 2004/0000976 | A1 | 1/2004 | Killen et al. |
| 2004/0001024 | A1 | 1/2004 | Killen et al. |
| 2004/0001026 | A1 | 1/2004 | Killen et al. |
| 2004/0001027 | A1 | 1/2004 | Killen et al. |
| 2004/0001028 | A1 | 1/2004 | Killen et al. |
| 2004/0012081 | A1 | 1/2004 | Kwon |
| 2004/0033654 | A1 | 2/2004 | Yamagata |
| 2004/0070915 | A1 | 4/2004 | Nagai et al. |
| 2004/0084080 | A1 | 5/2004 | Sager et al. |
| 2004/0092236 | A1 | 5/2004 | Irie et al. |
| 2004/0113738 | A1 | 6/2004 | Ahn et al. |
| 2004/0118448 | A1 | 6/2004 | Scher et al. |
| 2004/0189528 | A1 | 9/2004 | Killen et al. |
| 2005/0036269 | A1 | 2/2005 | Ma et al. |
| 2005/0051870 | A1 | 3/2005 | Yamazaki et al. |
| 2006/0086994 | A1 | 4/2006 | Viefers et al. |
| 2006/0092079 | A1 | 5/2006 | deRochemont |
| 2006/0125681 | A1 | 6/2006 | Smith et al. |
| 2006/0134491 | A1 | 6/2006 | Hilchenko et al. |
| 2007/0003781 | A1 | 1/2007 | deRochemont |
| 2007/0137257 | A1 | 6/2007 | Desantolo et al. |
| 2007/0139976 | A1 | 6/2007 | deRochemont |
| 2007/0166453 | A1 | 7/2007 | Van Duren et al. |
| 2007/0170535 | A1 | 7/2007 | deRochemont |
| 2007/0259768 | A1 | 11/2007 | Kear et al. |
| 2008/0136395 | A1 | 6/2008 | Bennett |
| 2009/0004370 | A1 | 1/2009 | Zurcher et al. |

(56) References Cited

U.S. PATENT DOCUMENTS

| | | | | |
|---|---|---|---|---|
| 2009/0011922 | A1 | 1/2009 | deRochemont | |
| 2009/0015314 | A1 | 1/2009 | Kirchmeier et al. | |
| 2009/0278756 | A1 * | 11/2009 | Friman et al. | 343/748 |
| 2011/0021007 | A1 | 1/2011 | deRochemont | |
| 2011/0049394 | A1 | 3/2011 | deRochemont | |
| 2011/0065224 | A1 | 3/2011 | Bollman et al. | |

FOREIGN PATENT DOCUMENTS

| | | | |
|---|---|---|---|
| EP | 1376759 | A2 | 2/2004 |
| GB | 1125897 | A | 9/1968 |

OTHER PUBLICATIONS

Bardi, I. et al. Plane Wave Scattering From Frequency-Selective Surfaces by the Finite-Element Method. IEEE Transactions on Magnetics 38(2) Mar. 2002. pp. 641-644.

Chappell, W. et al. Composite Metamaterial Systems for Two-Dimensional Periodic Structures. © 2002 IEEE pp. 384-387.

Cheng, Y.L. et al. Preparation and Characterization of (Ba.Sr)TiO3 thin films using interdigital electrodes. Microelectronic Engineering vol. 66 (2003) 872-879.

Clavijo, S. et al. Design Methodology for Sievenpiper High-Impedance Surfaces: An Artificial Magnetic Conductor for Positive Gain Electrically Small Antennas. IEEE Transactions on Antennas and Propagation 51(10). Oct. 2003. pp. 2678-2690.

Diaz, R. et al. Magnetic Loading of Artificial Magnetic Conductors for Bandwidth Enhancement. © 2003 IEEE pp. 431-434.

Hansen, R.C. Effects of a High-Impedance Screen on a Dipole Antenna. IEEE Antennas and Wireless Propagation Letters vol. 1 2002 pp. 46-49.

Joshi, P.C. et al. Processing and Characterization of Pure and Doped Ba0.6Sr 0.4TiO3 thin films for tunable microwave applications. Mat. Res. Soc. Symp. Proc. vol. 656E (2001) DD4.9.1-DD4.9.6.

Kern, D.J. et al. Active Negative Impedance Loaded EBG Structures for the Realization of Ultra-Wideband Artificial Magnetic Conductors. © 2003 IEEE pp. 427-430.

Kern, D.J. et al. The Synthesis of Metamaterial Ferrites for RF Applications Using Electromagnetic Bandgap Structures. © 2003 IEEE pp. 497-500.

Kern, D.J. et al. Ultra-thin Electromagnetic Bandgap Absorbers Synthesized via Genetic Algorithms. © 2003 IEEE pp. 1119-1122.

Khun, R. et al., Characterization of Novel Mono- and Bifacially Active Semi-Transparent Crystalline Silicon Solar Cells, IEEE Transactions on Electron Devices, 46(10), Oct. 1999, p. 2013-2017.

Kretly, L.C. et al. The Influence of the Height Variation on the Frequency Bandgap in an AMC Artificial Magnetic Conductor for Wireless Applications: an EM Experimental Design Approach. Proceedings SBMO/IEEE MTT-S IMOC 2003 pp. 219-223.

Lee, Y. et al. Investigation of Electromagnetic Bandgap (EBG) Structures for Antenna Pattern Control. © 2003 IEEE, pp. 1115-1118.

McKinzie III, W.E. et al. Mitigation of Multipath Through the Use of an Artificial Magnetic Conductor for Precision CPS Surveying Antennas. © 2002 IEEE pp. 640-643.

McKinzie, W. et al. A Multi-Band Artificial Magnetic Conductor Comprised of Multiple FSS Layers. © 2003 IEEE pp. 423-426.

Monorchio, A. et al. Synthesis of Artificial Magnetic Conductors by Using Multilayered Frequency Selective Surfaces. IEEE Antennas and Wireless Propagation Letters vol. 1 2002 pp. 196-199.

Mosallaei, H. et al. Periodic Bandgap and Effective Dielectric Materials in Electromagnetics: Characterization and Applications in Nanocavities and Waveguides. IEEE Transactions on Antennas and Propagation 51(3). Mar. 2003. pp. 549-563.

Pontes, F.M. et al. Study of the dielectric and ferroelectric properties of chemically processed BaxSr1-xTiO3 thin films. Thin Solid Films, vol. 386, No. 1 (2001) 91-98.

Rogers, S. et al. AMCs Comprised of Interdigital Capacitor FSS Layers Enable Lower Cost Applications. © 2003 IEEE pp. 411-414.

Rogers, S. et al. An AMC-Based 802.11a/b Antenna for Laptop Computers. © 2003 IEEE pp. 10-13.

Sievenpiper, D.F. et al. Two-Dimensional Beam Steering Using an Electrically Tunable Impedance Surface. IEEE Transactions on Antennas and Propagation 51(10). Oct. 2003. pp. 2713-2722.

Sun, J. et al. Efficiency of Various Photonic Bandgap (PBG) Structures. 3rd Int'l. Conf. on Microwave and Millimeter Wave Technology Proceedings 2002. pp. 1055-1058.

Tsunemine, Y. et al. Pt/BaxSr(1-x)TiO3/Pt Capacitor Technology for 0.15 micron Embedded Dynamic Random Access Memory. Jap. J. Appl. Phys. vol. 43 No. 5A (2004) 2457-2461.

Vest, R.W. Metallo-organic decomposition (MOD) processing of ferroelectric and electro-optic films: A review. Ferroelectrics, 102:1, 53-68.

Viviani, M. et al. Positive Temperature Coefficient of Electrical Resistivity below 150k of Barium Strontium Titanate. J. Amer. Ceram. Soc. vol. 87 (2004) 756-758.

Weily, A.R. et al. Antennas Based on 2-D and 3-D Electromagnetic Bandgap Materials. © 2003 IEEE pp. 847-850.

Yang, H-Y. D. et al. Surface Waves of Printed Antennas on Planar Artificial Periodic Dielectric Structures. IEEE Transactions on Antennas and Propagation 49(3). Mar. 2001. pp. 444-450.

Zhang, Y. et al. Planar Artificial Magnetic Conductors and Patch Antennas. IEEE Transactions on Antennas and Propagation 51(10). Oct. 2003. pp. 2704-2712.

Ziroff, A. et al. A Novel Approach for LTCC Packaging Using a PBG Structure for Shielding and Package Mode Suppression. 33rd European Microwave Conference—Munich 2003 pp. 419-422.

* cited by examiner

30

Tunable Narrow Band Antenna

FREQUENCY-SELECTIVE DIPOLE ANTENNAS

CROSS REFERENCE TO RELATED APPLICATIONS

This application is a continuation-in-part of U.S. patent application Ser. No. 12/818,025 filed Jun. 17, 2010, which claims priority of U.S. Provisional Patent Application Ser. No. 61/187,687, filed Jun. 17, 2009, both of which applications are hereby incorporated herein by reference in their entirety.

This application claims priority from U.S. Provisional Patent Application Ser. No. 61/355,755, filed Jun. 17, 2010 and hereby incorporated herein by reference in its entirety.

FIELD OF THE INVENTION

The present invention relates generally to dipole antennas and particularly how they can be folded to maximize its resonant response at desirable frequencies.

BACKGROUND OF THE INVENTION

Antennas are used in sensors, radars and radio communication systems to transmit and/or receive electromagnetic signals wirelessly at frequencies over which the antenna element(s) experience electromagnetic resonance. Resonant dipole antennas are a class of antennas where the electromagnetic radiation emissivity/sensitivity is pronounced at the antenna's fundamental frequency and harmonics of the fundamental frequency. Resonant dipoles have low to moderate gain, which is useful in transceiver systems that require general insensitivity to the relative direction (and/or orientation) of transmit and receive antennas, such as mobile communications. They also have relatively high efficiency at resonance, which is commonly represented as a low return loss. In general, a dipole antenna spanning a length (Z) will exhibit its fundamental resonance frequency $f_{fund}$ (also known as the first harmonic) over electromagnetic emissions having wavelength(s) given by:

$$2l \cong \lambda_{fund} \quad (1)$$

TABLE 1

Required Communications Frequency Bands

| Country | UMTS | GSM |
|---|---|---|
| Europe | 2100 | 900 |
| United States/Canada | 850 or 1700 or 2100 | 1900 or 850 |
| China | 2100 | 900 |
| Japan | 2100 | (not supported) |
| Argentina | 850 | 1900 |
| Brazil | 2100 | 1800 |
| Chile | 850 or 1900 | 850 or 1900 |
| India | 2100 | 900 |
| Egypt | 2100 | 900 |
| South Africa | 2100 | 900 |

As shown in FIG. 1, a 0.5 m long dipole antenna will have its fundamental frequency 1 close to 300 MHz and harmonic resonances 2A,2B at odd integer multiples (900 MHz and 1500 MHz) of the fundamental frequency 1. Although dipole antennas have some desirable characteristics for mobile device applications, such as low to moderate gain and high efficiency (low return loss), their conductive pass bands 1, 2A, 2B do not align with the allocated communication frequency bands (UMTS 1700, UMTS 1900, UMTS 2100, GPS, GSM 850, GSM 900, GSM 1700, GSM 1800, and WiFi) typically used by these devices. As a consequence, multiple antenna elements are required to cover the frequency spectrum requirements of a typical mobile communications device. Table 1 shows the required frequency bands for cellular communications using voice, text, and mobile data over Universal Mobile Telecommunications Systems (UMTS) third-generation (3G) systems in various countries around the world, as well as the required frequency bands for cellular communications using voice, text and mobile data over Global System for Mobile Communications (GSM) second-generation (2G) systems in those countries. Most countries recommend supporting a larger number of frequency bands than those shown in TABLE 1 depending upon the size of its geographic territory and/or telecommunications market. The larger number of frequency bands allows multiple carriers (service providers) to supply the national population and bid for premium (required) bands in regions where they have higher customer concentrations, while lowering carrier costs by using lower value (recommended) bands in regions where their customer concentration is less strong.

As a result of this general landscape within the industry, a single service provider will likely require mobile wireless devices that contain multiple antennas/radio systems to faultlessly navigate its domestic territory or provide global portability. The better broadband antennas will electrically communicate with 33% bandwidth ($\Delta f/f_{center}$) and have a peak efficiency of 70-80%, where $\Delta f = f_{upper} - f_{lower}$. These broadband antennas would allow a single antenna element to cover two bands that are closely positioned in frequency, such as the GSM 1700 and GSM 1800 bands (see TABLE 2), but not all the frequency bands at which the mobile wireless unit must communicate and certainly not at peak efficiency. Multiple antenna elements are undesirable since each element adds to the overall cost and occupied volume.

TABLE 2

Select Frequencies of Cellular Communications Bands

| Frequency Band | | Uplink (MHz) | Downlink (MHz) |
|---|---|---|---|
| UMTS | 2100 | 1920-1980 | 2110-2170 |
| | 1900 | 1850-1910 | 1930-1990 |
| | 1700 IX | 1749.9-1784.9 | 1844.9-1879.9 |
| | 1700 X | 1710-1770 | 2110-2170 |
| GSM | 1900 | 1850.2-1910.2 | 1930.2-1990.2 |
| | 1800 | 1710.2-1785.8 | 1805.2-1879.8 |
| | 900 | 880-915 | 925-960 |
| | 850 | 824-849 | 869-894 |

Filtering components are electrically coupled with the antenna system in the RF front-end to isolate specific frequency bands of interest for a given transceiver (radio/radar) application. The filtering components prevent electromagnetic emissions that fall outside of the desired frequency range(s) from interfering with the signal(s) of interest and are generally required to isolate the chosen frequency band from any undesirable frequency emissions to a level −40 dB or more in most applications. As shown in TABLE 2, mobile communications system designate a portion (subband) of the communications band for uplink frequencies (from the mobile device to the tower) and another portion for downlink frequencies (from the tower to the mobile device). The RF front-end must fully isolate these distinct signaling frequencies from one another and operate simultaneously if full duplex mode communications is desired. Acoustic-wave filters are generally used in cellular communications systems to isolate uplink frequencies 3 from downlink frequencies 4 and provide the requisite better than −40 dB signal isolation as shown in FIGS. 2A&2B. In addition to adding cost to and occupying space on the mobile platform, acoustic-wave filters will contribute 1.5 dB to 3 dB insertion loss between the antenna and the send/receive circuitry. Higher insertion losses are undesirable as they divert the available power to the radio and away from other useful functions.

Mobile wireless devices have radios with fixed frequency tuning, so a single radio system will only communicate over a specific frequency band. As a result of the fixed uplink/downlink tuning most mobile devices will have multiple radio systems since a given wireless carrier may not have license to operate at the premium (required) frequency bands shown in TABLE 1 throughout an entire nation. A given wireless service provider will be less likely to have access to the premium or required frequencies in foreign countries. The need for additional radios in their mobile systems is undesirable as it adds considerable cost to the service.

1. Description of the Prior Art

The following is a representative sampling of the prior art.

Kinezos et al., U.S. Ser. No. 12/437,448, (U.S. Pub. No. 2010/0283688 A1), "MULTIBAND FOLDED DIPOLE TRANSMISSION LINE ANTENNA", filed May 7, 2009, published Nov. 11, 2010 discloses a multiband folded dipole transmission line antenna including a plurality of concentric-like loops, wherein each loop comprises at least one transmission line element, and other antenna elements.

Tran, U.S. Ser. No. 12/404,175, (U.S. Pub. No. 2010/0231461 A1), "FREQUENCY SELECTIVE MULTI-BAND ANTENNA FOR WIRELESS COMMUNICATION DEVICES", filed Mar. 13, 2009, published Sep. 16, 2010 discloses a modified monopole antenna electrically connected to multiple discrete antenna loading elements that are variably selectable through a switch to tune the antenna between operative frequency bands.

Walton et al., U.S. Pat. No. 7,576,696 B2, "MULTI-BAND ANTENNA", filed Jul. 13, 2006, issued Aug. 18, 2009 discloses the use of multiple assemblies consisting of arrays of discrete antenna elements to form an antenna system that selectively filters electromagnetic bands.

Zhao et al., U.S. Ser. No. 12/116,224, (U.S. Pub. No. 2009/0278758 A1), "DIPOLE ANTENNA CAPABLE OF SUPPORTING MULTI-BAND COMMUNICATIONS", filed May 7, 2008, published Nov. 12, 2009 discloses a multiband folded dipole structure containing two electrically interconnected radiating elements wherein one of the radiating elements has capacitor pads that couple with currents the other radiating element to produce the "slow-wave effect".

Su et al., U.S. Ser. No. 11/825,891, (U.S. Pub. No. 2008/0007461 A1), "MULTI-BAND ANTENNA", filed Jul. 10, 2007, published Jan. 10, 2008 discloses a U-shaped multi-band antenna that has internal reactance consisting of a ceramic or multilayer ceramic substrate.

Rickenbrock, U.S. Ser. No. 11/704,157, (U.S. Pub. No. 2007/0188399 A1), "DIPOLE ANTENNA", filed Feb. 8, 2007, published Aug. 16, 2007 discloses a selective frequency dipole antenna consisting of a radiator comprising conductor regions that have alternating shape (zig-zag or square meander lines) with an interleaving straight line conductor section, as well as a multiband antenna dipole antenna consisting of a plurality of radiators so constructed, which may be deployed with and without coupling to capacitive or inductive loads.

Loyet, U.S. Pat. No. 7,394,437 B1, "MULTI-RESONANT MICROSTRIP DIPOLE ANTENNAS", filed Aug. 23, 2007, issued Jul. 1, 2008 discloses the use of multiple microstrip dipole antennas that resonate at multiple frequencies due to "a microstrip island" inserted within the antenna array.

Brachat et al., U.S. Pat. No. 7,432,873 B2, "MULTI-BAND PRINTED DIPOLE ANTENNA", filed Aug. 7, 2007, issued Oct. 7, 2008 disclose the use of a plurality of printed dipole antenna elements to selectively filter multiple frequency bands.

Brown and Rawnick, U.S. Pat. No. 7,173,577, "FREQUENCY SELECTIVE SURFACES AND PHASED ARRAY ANTENNAS USING FLUIDIC SURFACES", filed Jan. 21, 2005, issued Feb. 6, 2007 discloses dynamically changing the composition of a fluidic dielectric contained within a substrate cavity to change the permittivity and/or permeability of the fluidic dielectric to selectively alter the frequency response of a phased array antenna on the substrate surface.

Gaucher et al., U.S. Pat. No. 7,053,844 B2, "INTEGRATED MULTIBAND ANTENNAS FOR COMPUTING DEVICES", filed Mar. 5, 2004, issued May 30, 2006 discloses a multiband dipole antenna element that contains radiator branches.

Nagy, U.S. Ser. No. (U.S. Pub. No. 2005/0179614 A1), "DYNAMIC FREQUENCY SELECTIVE SURFACES", filed Feb. 18, 2004, published Aug. 18, 2005 discloses the use of a microprocessor controlled adaptable frequency-selective surface that is responsive to operating characteristics of at least one antenna element, including a dipole antenna element.

Poilasne et al., U.S. Pat. No. 6,943,730 B2, "LOW-PROFILE, MULTI-FREQUENCY, MULTI-BAND, CAPACITIVELY LOADED MAGNETIC DIPOLE ANTENNA", filed Apr. 25, 2002, issued Sep. 13, 2005 discloses the use of one or more capacitively loaded antenna elements wherein capacitive coupling between two parallel plates and the parallel plates and a ground plane and inductive coupling generated by loop currents circulating between the parallel plates and the ground plane is adjusted to cause the capacitively loaded antenna element to be resonant at a particular frequency band and multiple capacitively loaded antenna elements are added to make the antenna system receptive to multiple frequency bands.

Desclos et al., U.S. Pat. No. 6,717,551 B1, "LOW-PROFILE, MULTI-FREQUENCY, MULTI-BAND, MAGNETIC DIPOLE ANTENNA", filed Nov. 12, 2002, issued Apr. 6, 2004, discloses the use of one or more U-shaped antenna elements wherein capacitive coupling within a U-shaped antenna element and inductive coupling between the U-shaped antenna element and a ground plane is adjusted to cause said U-shaped antenna element to be resonant at a particular frequency band and multiple U-shaped elements are added to make the antenna system receptive to multiple frequency bands.

Hung et al., U.S. Ser. No. 10/630,597 (U.S. Pub. No. 2004/0222936 A1), "MULTI-BAND DIPOLE ANTENNA", filed Jul. 20, 2003, published Nov. 11, 2004 discloses a multi-band dipole antenna element that consists of metallic plate or metal film formed on an insulating substrate that comprises slots in the metal with an "L-shaped" conductor material located within the slot that causes the dipole to be resonant at certain select frequency bands.

Wu, U.S. Pat. No. 6,545,645 B1, "COMPACT FREQUENCY SELECTIVE REFLECTIVE ANTENNA", filed Sep. 10, 1999, issued Apr. 8, 2003 disclose the use of optical interference between reflective antenna surfaces to selective specific frequencies within a range of electromagnetic frequencies.

Kaminski and Kolsrud, U.S. Pat. No. 6,147,572, "FILTER INCLUDING A MICROSTRIP ANTENNA AND A FREQUENCY SELECTIVE SURFACE", filed Jul. 15, 1998, issued Nov. 14, 2000 discloses the use of a micro-strip antenna element co-located within a cavity to form a device that selective filters frequencies from a range of electromagnetic frequencies.

Ho et al., U.S. Pat. No. 5,917,458, "FREQUENCY SELECTIVE SURFACE INTEGRATED ANTENNA SYSTEM", filed Sep. 8, 1995, issued Jun. 29, 1999 discloses a frequency selective dipole antenna that has frequency selectivity by virtue of being integrated upon the substrate that is designed to operate as a frequency selective substrate.

MacDonald, U.S. Pat. No. 5,608,413, "FREQUENCY-SELECTIVE ANTENNA WITH DIFFERENT POLARIZATIONS", filed Jun. 7, 1995, issued Mar. 4, 1997 discloses an antenna formed using co-located slot and patch radiators to mildly select frequencies and alter the polarization of radiation emissions.

Stephens, U.S. Pat. No. 4,513,293, "FREQUENCY SELECTIVE ANTENNA", filed Nov. 12, 1981, issued Apr. 23, 1985, discloses an antenna comprising a plurality of parabolic sections in the form of concentric rings or segments that allow the antenna uses mechanically means to select specific frequencies within a range of electromagnetic frequencies.

2. Definition of Terms

The term "active component" is herein understood to refer to its conventional definition as an element of an electrical circuit that that does require electrical power to operate and is capable of producing power gain.

The term "amorphous material" is herein understood to mean a material that does not comprise a periodic lattice of atomic elements, or lacks mid-range (over distances of 10's of nanometers) to long-range crystalline order (over distances of 100's of nanometers).

The terms "chemical complexity", "compositional complexity", "chemically complex", or "compositionally complex" are herein understood to refer to a material, such as a metal or superalloy, compound semiconductor, or ceramic that consists of three (3) or more elements from the periodic table.

The terms "discrete assembly" or "discretely assembled" is herein understood to mean the serial construction of an embodiment through the assembly of a plurality of pre-fabricated components that individually comprise a discrete element of the final assembly.

The term "emf" is herein understood to mean its conventional definition as being an electromotive force.

The term "integrated circuit" is herein understood to mean a semiconductor chip into which at least one transistor element has been embedded.

The term "LCD" is herein understood to mean a method that uses liquid precursor solutions to fabricate materials of arbitrary compositional or chemical complexity as an amorphous laminate or free-standing body or as a crystalline laminate or free-standing body that has atomic-scale chemical uniformity and a microstructure that is controllable down to nanoscale dimensions.

The term "liquid precursor solution" is herein understood to mean a solution of hydrocarbon molecules that also contains soluble metalorganic compounds that may or may not be organic acid salts of the hydrocarbon molecules into which they are dissolved.

The term "meta-material" is herein understood to define a composite dielectric material that consists of a low-loss host material having a dielectric permittivity in the range of $1.5 \leq \in_R \leq 5$ with at least one dielectric inclusion embedded within that has a dielectric permittivity of $\in_R \geq 10$ or a dielectric permeability $\mu_R \# 1$ that produces an "effective dielectric constant" that is different from either the dielectric host or the dielectric inclusion.

The term "microstructure" is herein understood to define the elemental composition and physical size of crystalline grains forming a material substance.

The term "MISFET" is herein understood to mean its conventional definition by referencing a metal-insulator-semiconductor field effect transistor.

The term "mismatched materials" is herein understood to define two materials that have dissimilar crystalline lattice structure, or lattice constants that differ by 5% or more, and/or thermal coefficients of expansion that differ by 10% or more.

The term "MOSFET" is herein understood to mean its conventional definition by referencing a metal-oxide-silicon field effect transistor.

The term "nanoscale" is herein understood to define physical dimensions measured in lengths ranging from 1 nanometer (nm) to 100's of nanometers (nm).

The term "passive component" is herein understood to refer to its conventional definition as an element of an electrical circuit that that does not require electrical power to operate and is not capable of producing power gain.

The term "standard operating temperatures" is herein understood to mean the range of temperatures between −40° C. and +125° C.

The terms "tight tolerance" or "critical tolerance" are herein understood to mean a performance value, such as a capacitance, inductance, or resistance that varies less than ±1% over standard operating temperatures.

In view of the above discussion, it would be beneficial to have methods to have antenna systems that reduce the cost, component count, power consumption and occupied volume in fixed wireless and mobile wireless systems by either using a single antenna element to selectively filter multiple bands. For the same purposes, it would also be beneficial to have a high radiation efficiency narrow band antenna that eliminates the need for additional filtering components in the RF front-end. It would also be beneficial to have a high radiation efficiency narrow band that can be actively tuned to vary its center frequency to mitigate the need for multiple radio systems in a globally portable wireless device.

It is an object of the present invention to provide a single antenna element that is strongly resonant over multiple selective frequency bands or all communications bands of interest for a particular device to eliminate the need for multiple antenna systems, thereby minimizing cost, component count, and occupied volume without compromising the mobile system's signal integrity.

It is a further object of the present invention to provide a single antenna element that has a sufficiently narrow conductance band (25 MHz to 60 MHz) to isolate uplink frequencies from the downlink frequencies in the same communications band, thereby eliminating the need to add filtering components, like acoustic-wave filters, to the RF front-end to minimize cost, component count and occupied volume.

It is yet another object of the present invention is to provide a narrow band (25 MHz to 60 MHz) antenna system that can actively retune the center frequency of a narrow conductive pass band to accommodate a plurality of communications frequency band tunings with a single antenna element.

SUMMARY OF THE INVENTION

The present invention generally relates to a single dipole antenna element that is tuned to have a frequency-selective resonant response, and in particular to folded dipole antennas in which high dielectric density ceramic material ($\in_R \geq 10$ and/or $\mu_R \geq 10$) has been selectively deposited into electromagnetically coupled regions that function as "reactive tuning elements" to produce the desired spectral response and/or to maximize the dipole's radiation efficiency.

The dipole arms are folded in a pre-determined manner to create a distributed network filter consisting of reactive tuning elements inserted along the length of the dipole arms. Inductive and/or capacitive tuning elements are configured in series or in parallel to produce one or more desirable conductive pass bands with suitable voltage standing wave ratios to achieve high instantaneous bandwidth. Reactive tuning elements are configured in series connection by introducing coupling within a dipole arm, and are configured in parallel connection by introducing coupling between the dipole arms.

High dielectric density ceramic material is inserted into electromagnetically coupled regions to strengthen the coupling of the reactive loading of a reactive tuning element. The coupling length of a reactive tuning element may be divided into a plurality of segments, in which each segment may contain a compositionally distinct high dielectric density ceramic material, or the absence of a high dielectric density ceramic, to fine tune the reactive loading of the segmented reactive tuning element.

Temperature stability of the dielectric properties of the ceramic material inserted into the electromagnetically coupled regions is essential to providing stable RF performance over any range of temperatures the dipole antenna would be expected to perform.

The distributed network filter so formed may tune the folded dipole antenna to produce multiple frequency-selective electromagnetic resonances that match a plurality of useful frequency bands.

Alternatively, the distributed network filter so formed may also tune the folded dipole antenna to produce a conductance pass band that is sufficiently narrow and sharp to isolate a communications uplink or a communications downlink sub-band when configured with a quarter-wave transformer in electrical communication with the dipole antenna feed point.

The resonance center frequency and band edges of a narrow and sharp conductance pass band antenna can be shifted by adaptively tuning the reactance of quarter-wave transformer by altering the capacitance and/or inductance in the feed network electrically communicating with dipole antenna's feed point.

One embodiment of the present invention provides a dipole antenna, comprising electrical dipole conductors folded to form distributed inductive and/or capacitive reactive loads between selected portions of one or more coupled line segments of the individual dipole conductors or between one dipole conductor to another, wherein the electrical dipole conductors form a selective frequency filter.

The dipole antenna may be formed on and/or in a substrate. The antenna may further comprise one or more dielectric elements having precise dielectric permittivity and/or permeability formed on and/or in the substrate and located in proximity to the coupled line segments for determining an enhanced distributed reactance in the inductive and/or capacitive reactive loads. The ceramic dielectric elements may have dielectric property that vary less than ±1% over temperatures between −40° C. and +125° C. The substrate may be a low-loss meta-dielectric material consisting of amorphous silica. The dipole antenna may form a distributed network that filters a wireless communications band. The dipole antenna may form a distributed network that filters multiple communications bands. A wireless device may the antenna described above.

Another embodiment of the present invention provides an antenna, comprising a substrate, electrical conductors formed on and/or in the substrate, and one or more ceramic dielectric elements having relative permittivity $\in_R \geq 10$ and/or relative permeability $\mu_R \geq 10$ formed on and/or in the substrate between selected portions of the electrical conductors for determining a distributed reactance within the selected portions.

The antenna may be a dipole antenna. The electrical conductors of the dipole antenna may be folded to form a distributed network filter. A wireless device maybe constructed using this antenna.

Yet another embodiment of the present invention provides a folded dipole antenna, comprising conducting dipole arms, a distributed network filter having distributed reactance within and between the conducting dipole arms, and a tunable reactance connected to an input of the distributed network filter for adjusting a resonant frequency of the antenna.

The distributed reactance within and between the conducting dipole arms that forms through the electromagnetic coupling of adjacent current vectors traveling within co-linear segments of the conducting dipole arms: has distributed series capacitance along co-linear conductor segments where the adjacent current vectors are traveling in the same dipole arm and have anti-parallel alignment; has distributed series inductance along co-linear conductor segments where the adjacent current vectors are traveling in the same dipole arm and have parallel alignment; has distributed parallel capacitance along co-linear conductor where the adjacent current vectors are traveling in different dipole arms and have anti-parallel alignment; and; the distributed reactance so configured forms a distributed network filter through the purposeful arrangement of capacitive and inductive loads in series and/or in parallel.

The folded dipole antenna may form a distributed network that filters frequencies used in a wireless communications band. The folded dipole antenna may form a distributed network that filters frequencies used in a plurality of wireless communications bands. The folded dipole antenna may form a narrow conductance distributed network filter that isolates frequencies used in an uplink or a downlink sub-band of a wireless communications band. The narrow conductance distributed network filter can switch between an uplink sub-band or a downlink sub-band in one wireless communications band to the uplink sub-band or the downlink sub-band in an adjacent wireless communications band by switching the distributed reactive loading in the feed network of the folded dipole antenna. A mobile wireless device may be constructed using this antenna.

BRIEF DESCRIPTION OF THE TABLES AND DRAWINGS

The present invention is illustratively shown and described in reference to the accompanying drawings, in which.

Figure 4A:
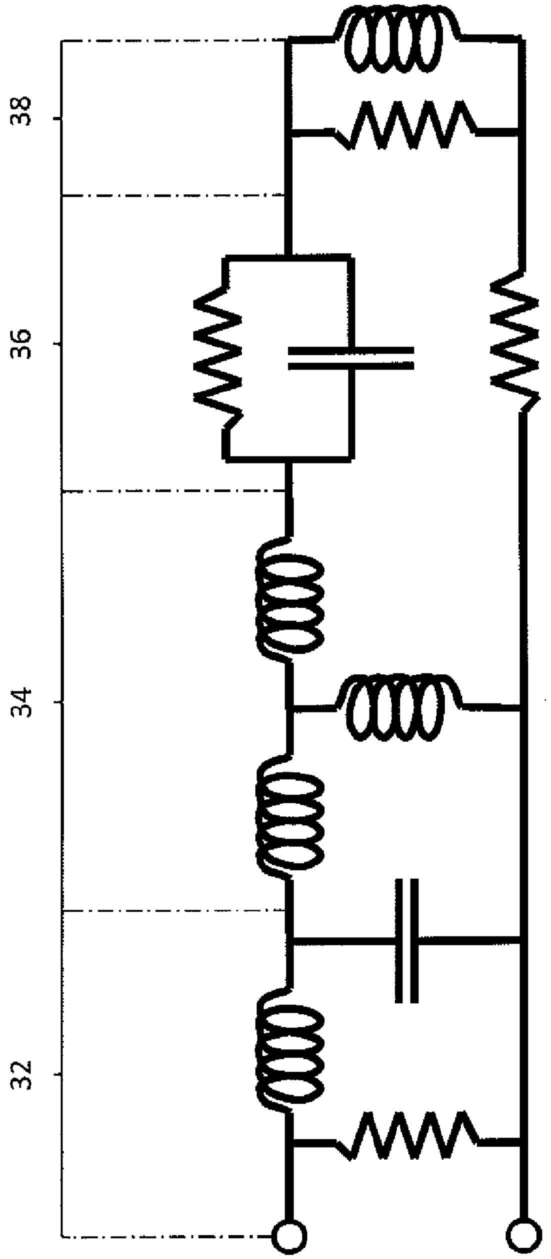

FIGS. 4A, B, C depict a distributed network filtering circuit and its equivalent representation using one-port, two-port and multi-port network analysis.

Figure 5A:
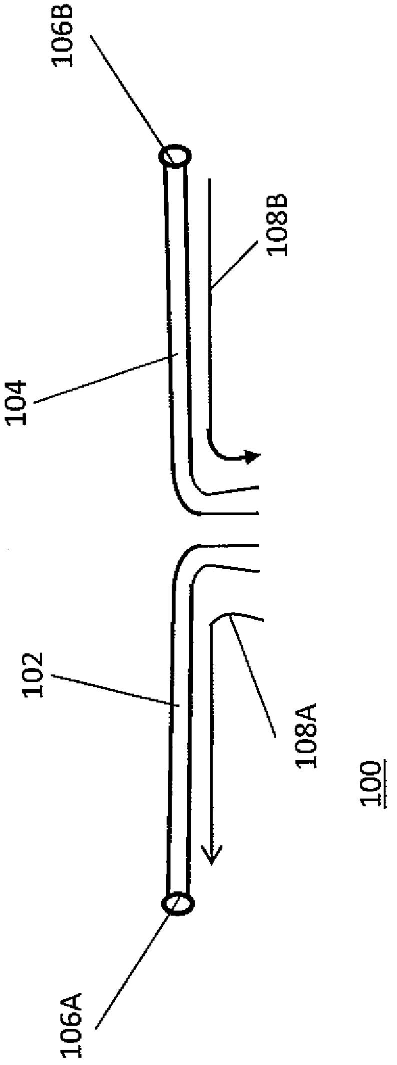

FIGS. 5A, B, C a dipole antenna element and its equivalent circuit models.

Figure 6A:
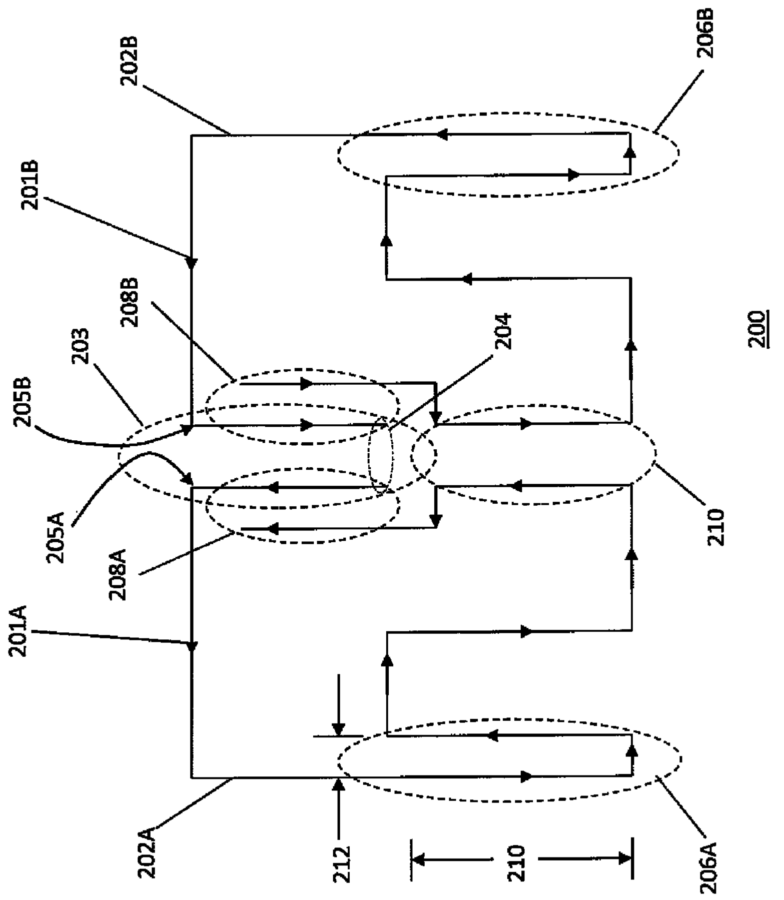
Figure 6B:
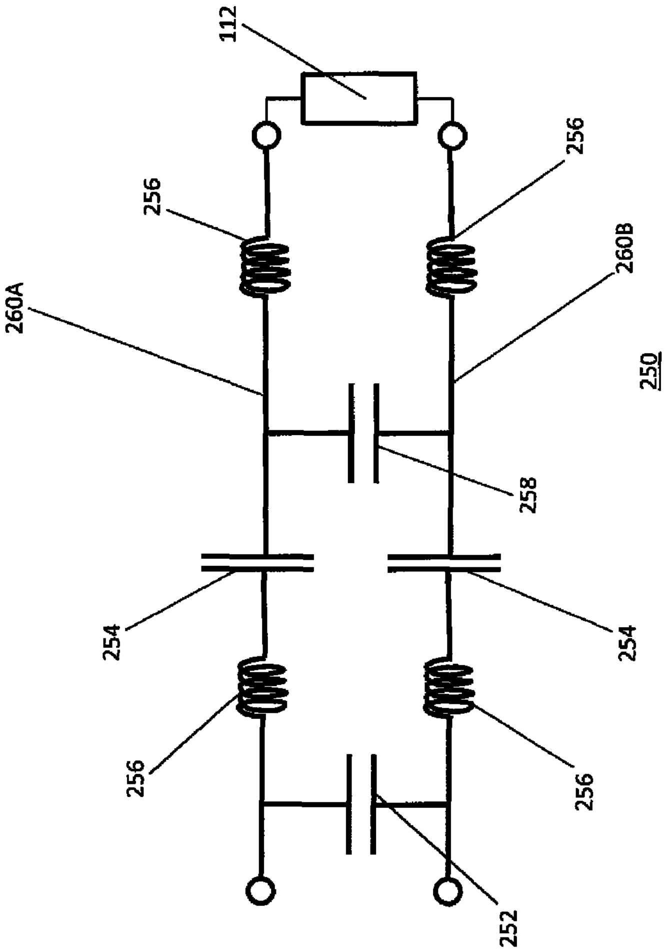

FIGS. 6A,B depicts co-linear current vector alignment in a folded dipole antenna element and its equivalent electrical circuit behavior when interpreted as a distributed network.

Figure 7:
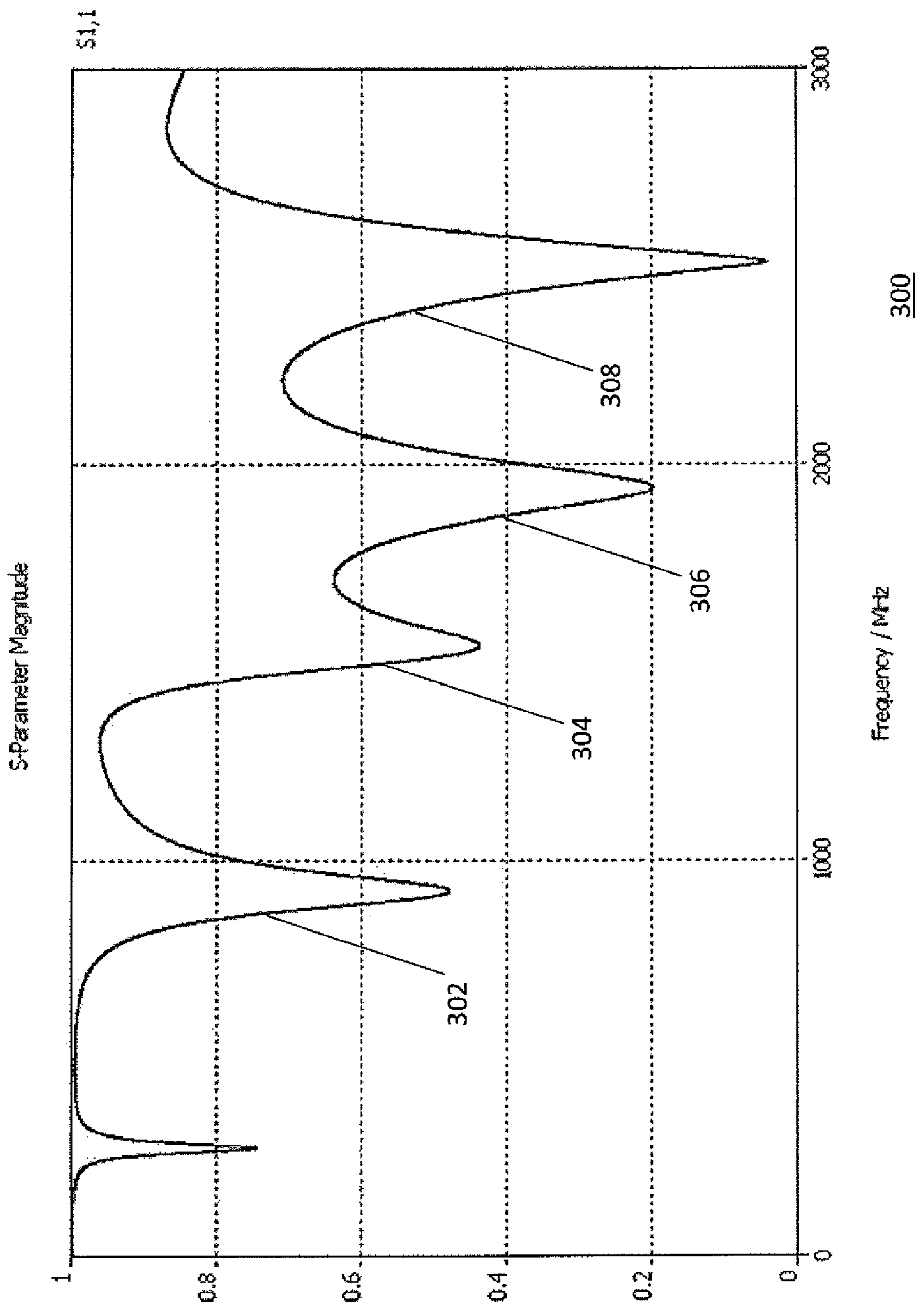

FIG. 7 depicts the return loss of a free-space folded dipole antenna element that is tuned to produce internal distributed reactance that allows it have resonant pass bands at multiple frequency ranges useful to mobile wireless communications.

FIGS. 8A, 8B, 8C, 8D depict an equivalent circuit model of a distributed network filter useful as a narrow pass band filter, a diagram of co-linear current vector alignment that reproduces distributed reactance in a narrow pass band folded dipole element, and the conductance band and VSWR bands of a dipole antenna element folded to function as a filter for the GSM 1800 uplink frequency band.

Figure 9A:
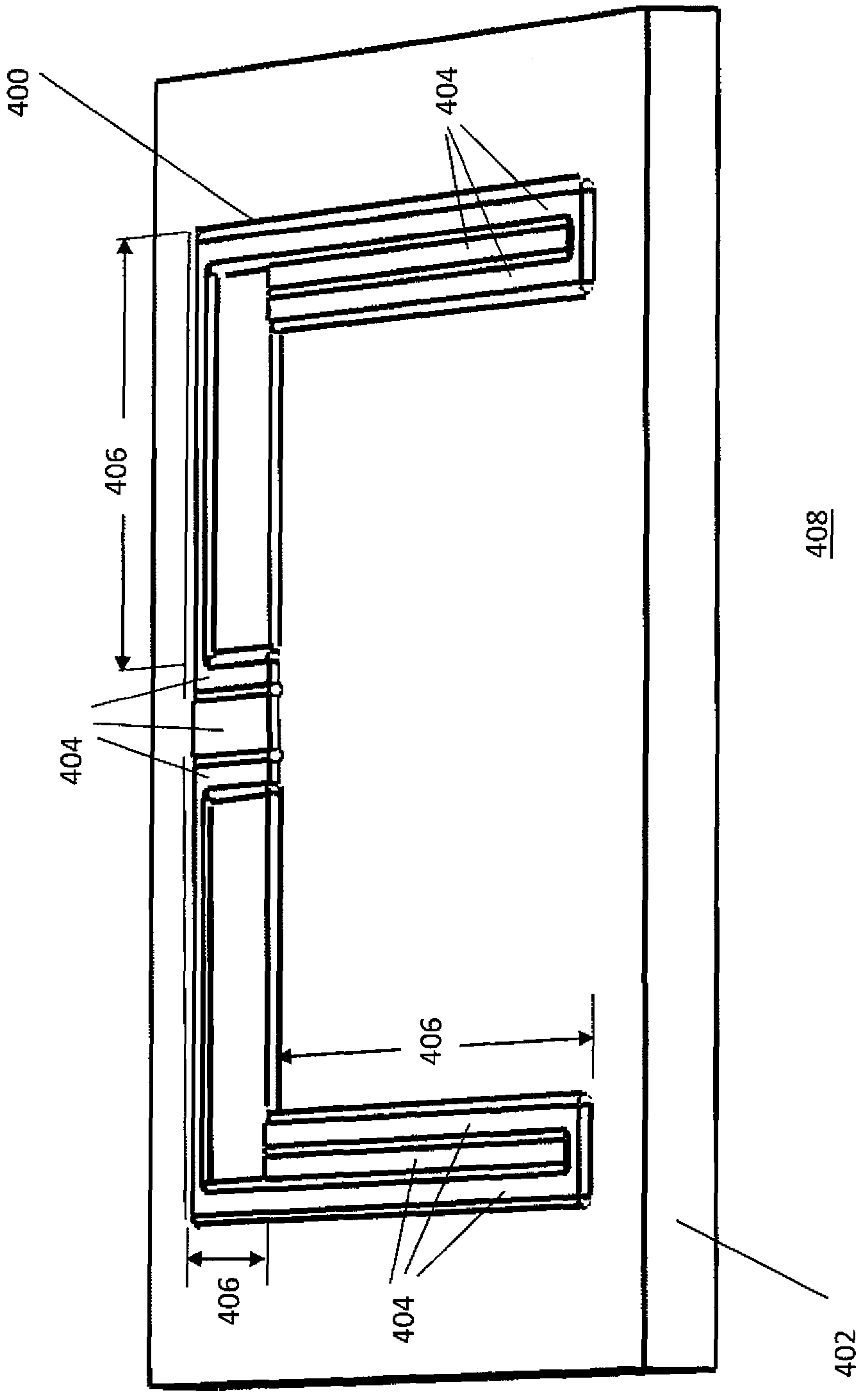
Figure 9B:
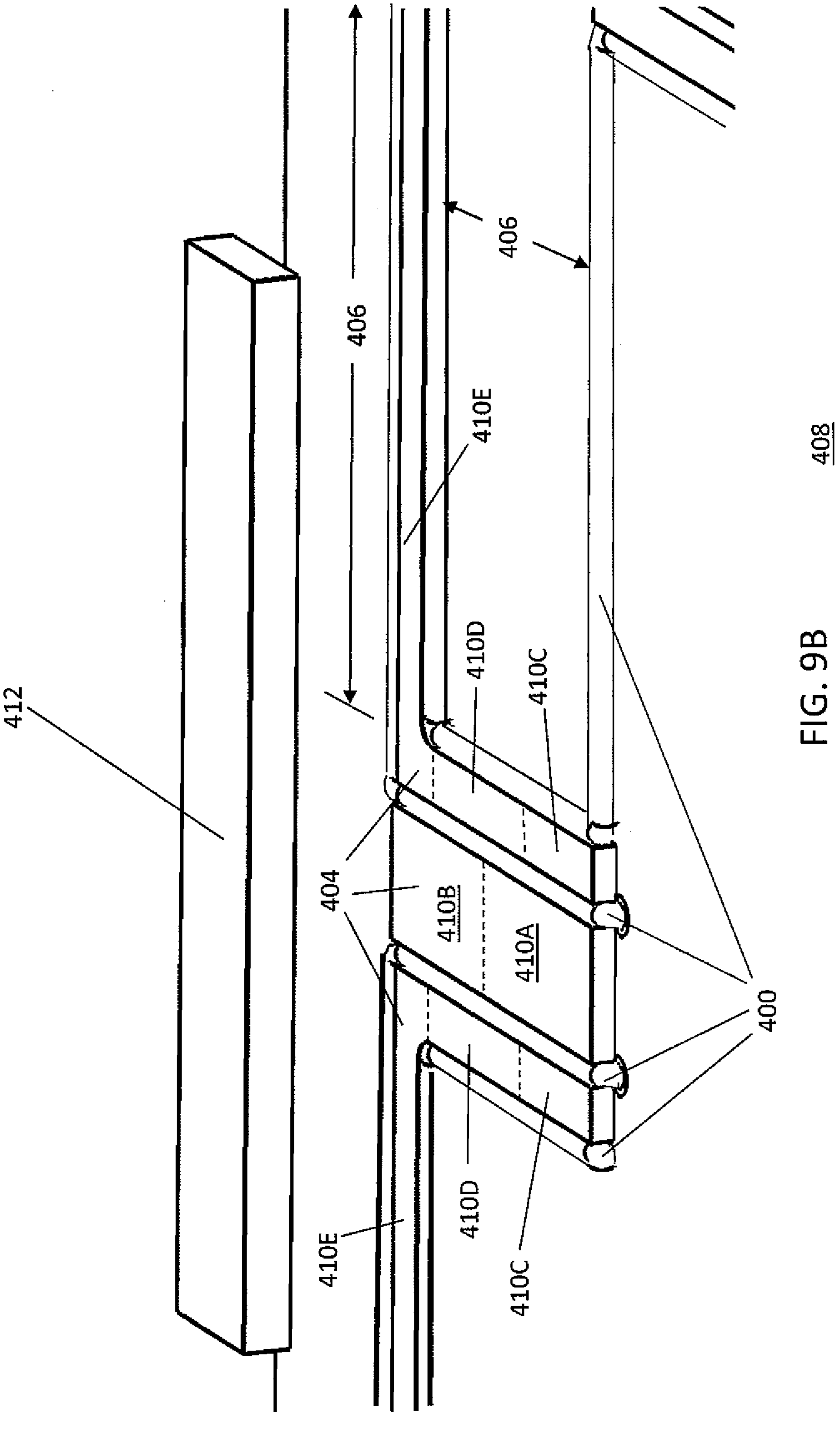
Figure 10A:
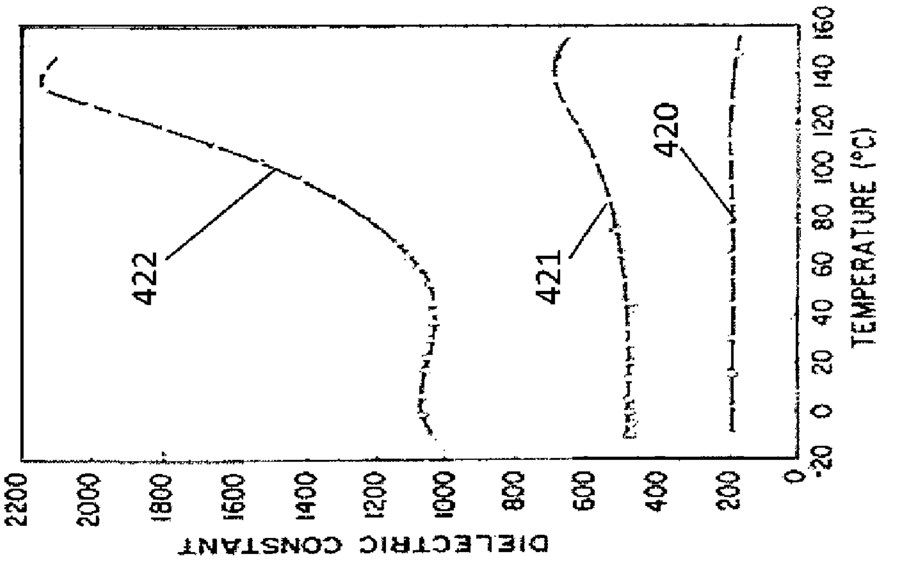

FIGS. 9A,9B depicts a folded dipole antenna element that has distributed reactance enhanced by dielectric loading FIG. 10A depicts material requirements for providing capacitive dielectric loads that are stable with varying temperature.

Figure 11:
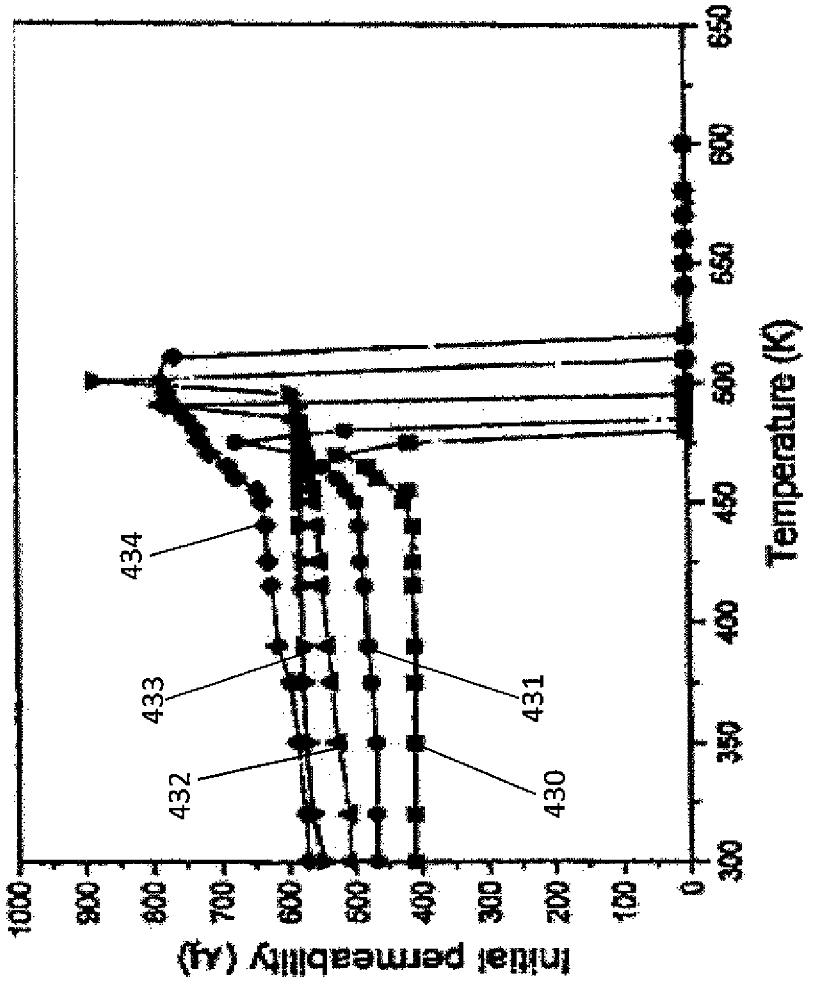

FIG. 11 depicts material system requirements for providing inductive dielectric loads that are stable with varying temperature.

Figure 12:
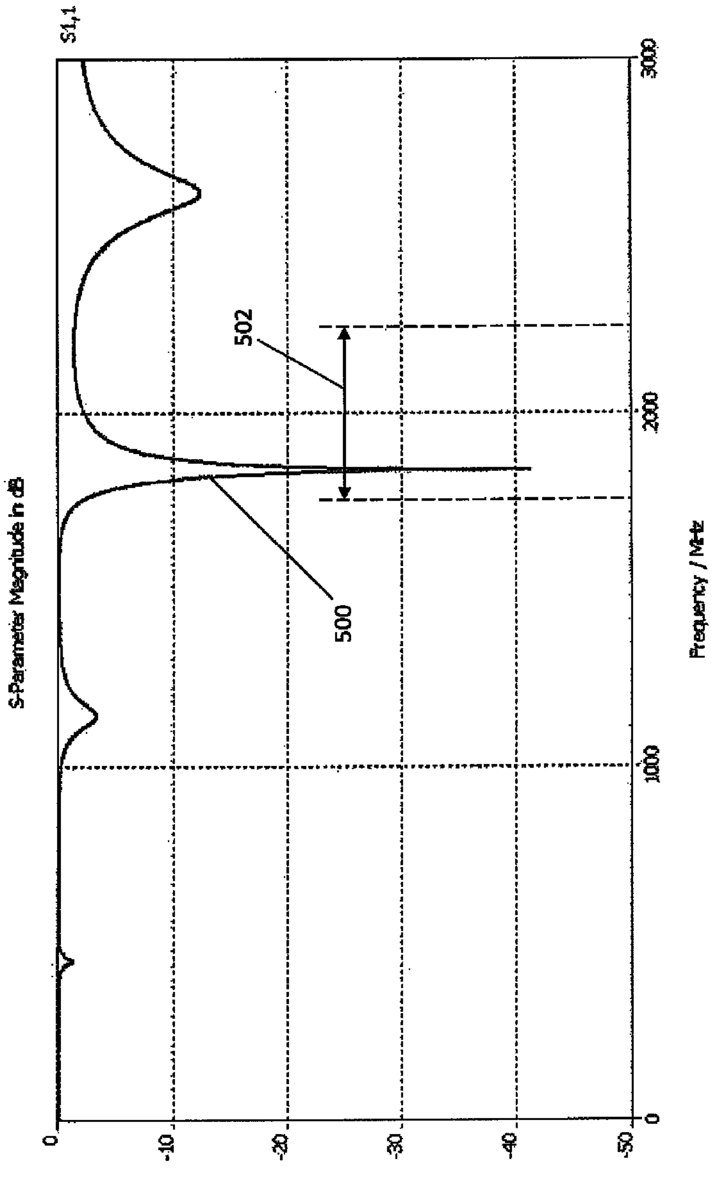

FIG. 12 depicts the pass band of a tunable narrow conductance pass band antenna system.

Figure 13:
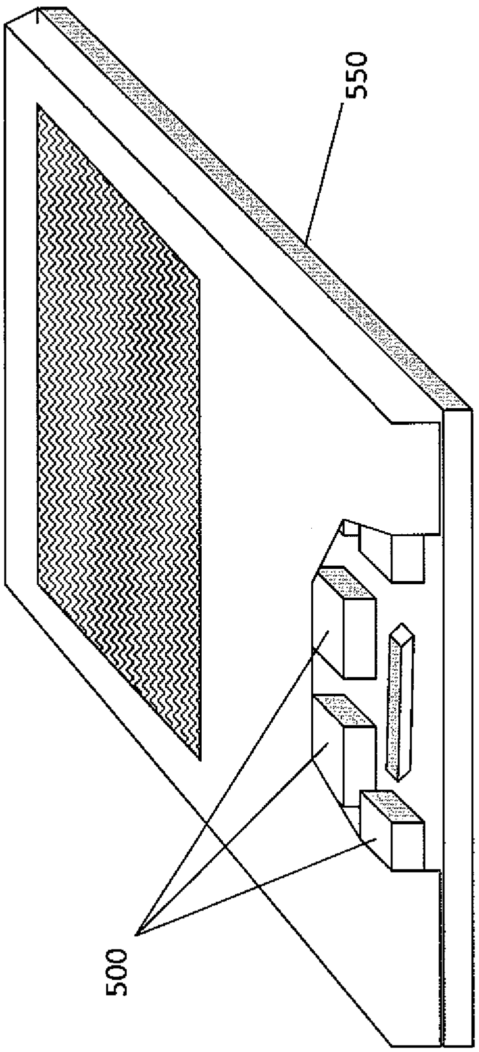

FIG. 13 depicts the use of a tunable narrow conductance pass band antenna system in a mobile wireless device.

Figure 14:
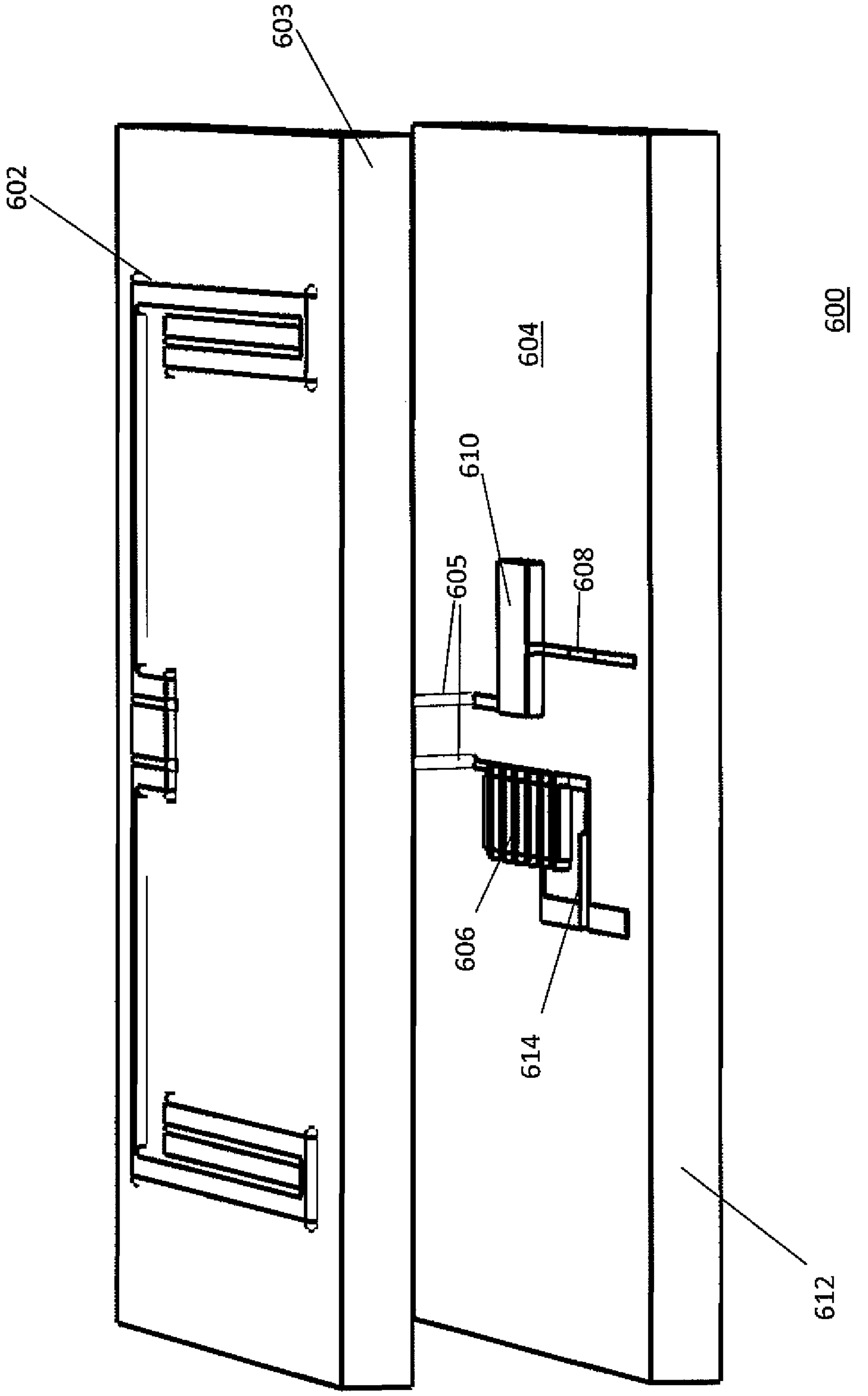

FIG. 14 depicts a basic circuit assembly useful in making a tunable narrow conductance pass band antenna system.

DETAILED DESCRIPTION OF THE INVENTION

The present invention is illustratively described above in reference to the disclosed embodiments. Various modifications and changes may be made to the disclosed embodiments by persons skilled in the art.

This application incorporates by reference all matter contained in de Rochemont '698, U.S. Pat. No. 7,405,698 entitled "CERAMIC ANTENNA MODULE AND METHODS OF MANUFACTURE THEREOF", its divisional application de Rochemont '002, filed U.S. patent application Ser. No. 12/177,002 entitled "CERAMIC ANTENNA MODULE AND METHODS OF MANUFACTURE THEREOF", de Rochemont '159 filed U.S. patent application Ser. No. 11/479,159, filed Jun. 30, 2006, entitled "ELECTRICAL COMPONENTS AND METHOD OF MANUFACTURE", and de Rochemont '042, U.S. patent application Ser. No. 11/620,042, filed Jan. 6, 2007 entitled "POWER MANAGEMENT MODULE AND METHOD OF MANUFACTURE", de Rochemont and Kovacs '112, U.S. Ser. No. 12/843,112 filed Jul. 26, 2010, entitled "LIQUID CHEMICAL DEPOSITION PROCESS APPARATUS AND EMBODIMENTS", and de Rochemont '222, U.S. Ser. No. 13/152,222 filed Jun. 2, 2011 entitled "MONOLITHIC DC/DC POWER MANAGEMENT MODULE WITH SURFACE FET".

A principal objective of the invention is to develop means to design and construct a high-efficiency frequency selective antenna system that uses a single dipole antenna element to isolate one or more RF frequency bands by folding the dipole arms in a manner that causes it to function as a distributed network filter. Reference is now made to FIGS. 3A,3B thru 4A, 4B, 4C to review the basic characteristics of electromagnetic transmission lines and distributed network filters and, by extension, to illustrate the basic operational and design principles of the invention. It is not the purpose of this disclosure to derive solutions from first principles, but merely to illustrate how well-known characteristics of distributed circuits and networks can be applied to designing a folded dipole selective-frequency antenna element. A more rigorous analysis on the physics of transmission lines can be found in "Fundamentals of Microwave Transmission Lines" by Jon C. Freeman, publisher John Wiley & Sons, Inc. 1996, ISBN 0-471-13002-8. A more rigorous analysis on the electrical characteristics of distributed networks is found in "Network Analysis, 3rd Edition" by M. E. Van Valkenburg, publisher Prentice Hall, 1974, ISBN 0-13-611095-9.

Figure 3A:
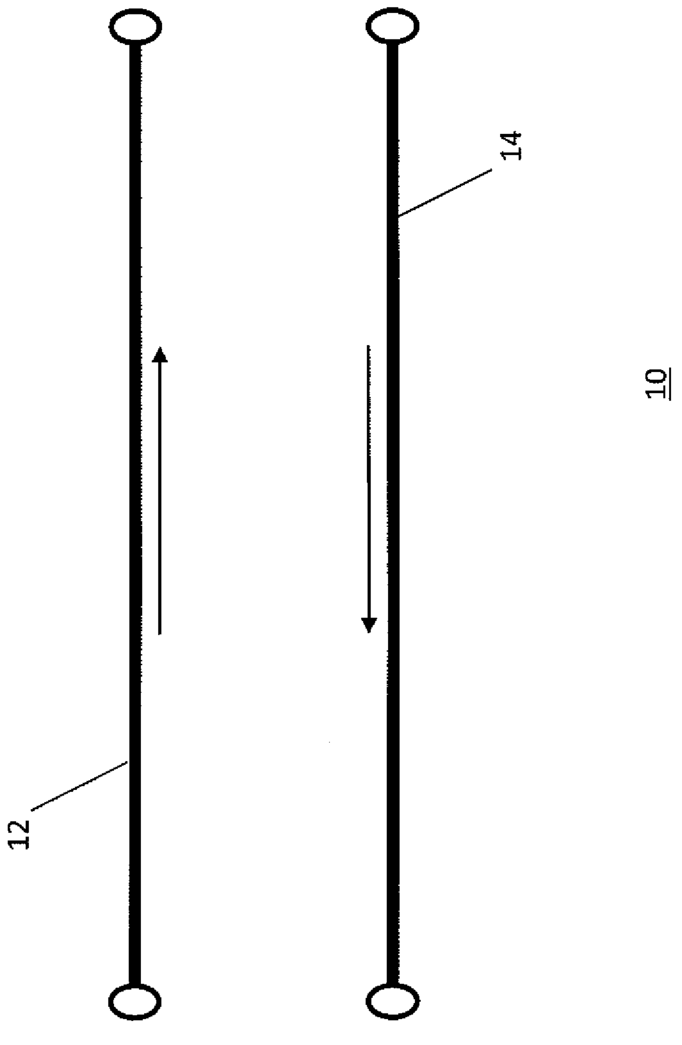
FIGS. 3A,3B depict a transmission line circuit and its equivalent circuit model.
Figure 3B:
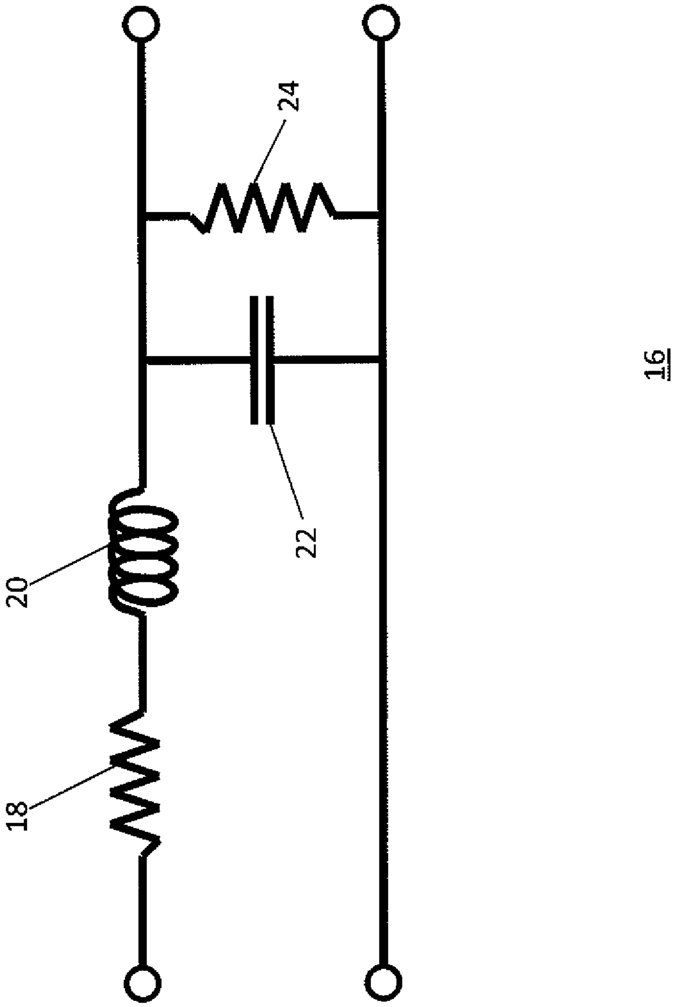

FIGS. 3A & 3B show the basic structure of a simple electromagnetic transmission line (TL) 10 consisting of a signal line 12 and a return line 14. An equivalent circuit 16 representation is often used to approximate and model functional characteristics per unit TL length that are useful in appraising impedance, line loss, and other time-dependent or frequency-dependent wave propagation properties of the transmission line 10. The unit length TL equivalent circuit 16 is characterized as having a series resistance 18, a series inductance 20, a shunt capacitance 22 and a shunt conductance 24.

Figure 4B:
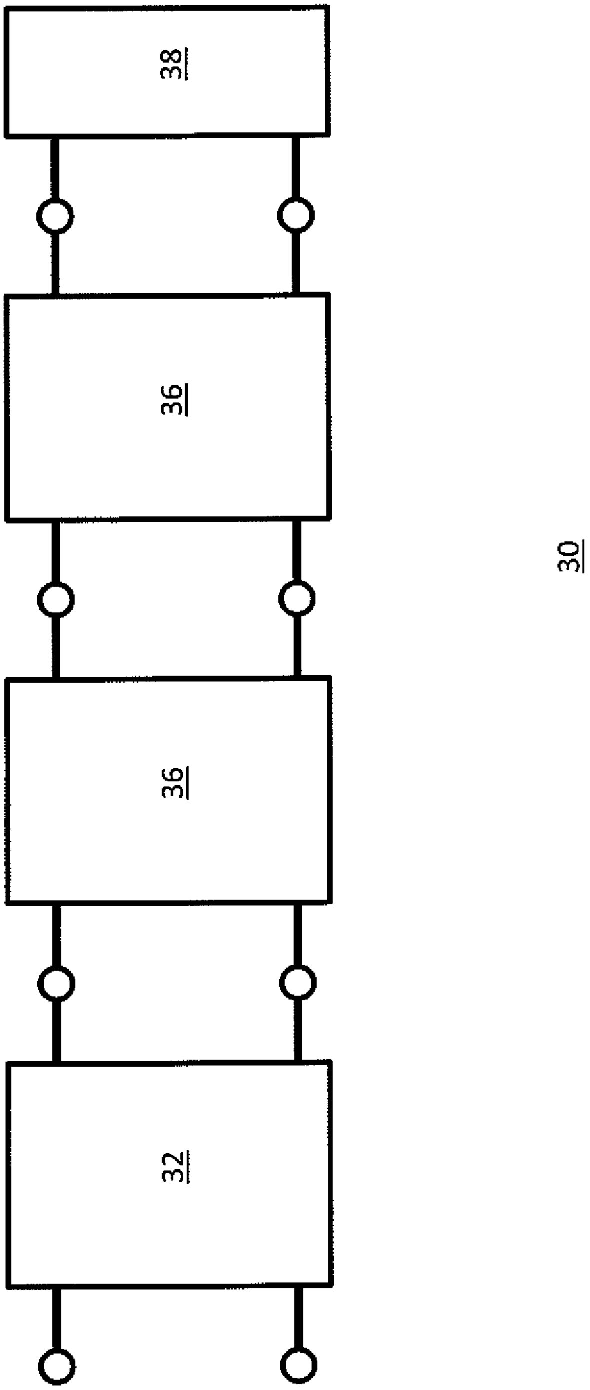
Figure 4C:
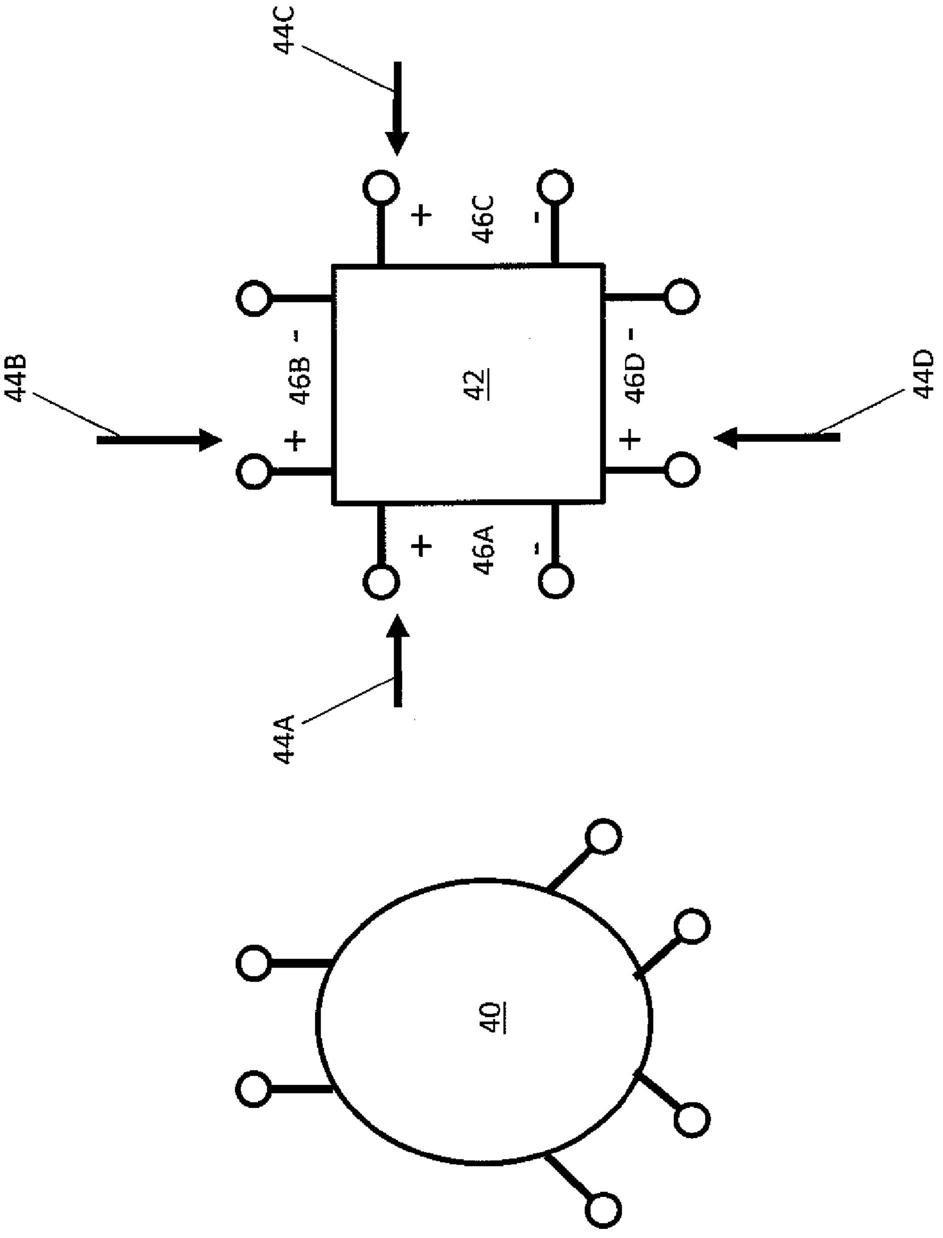

FIGS. 4A, 4B & 4C generally shows how network analysis is used to segment a complex discrete component filtering network 30 into a series of isolated ports 32, 34, 36, 38. Although for the purposes of this disclosure only one-port and two-port circuit isolations are needed to adequately describe the simple planar folded-dipole examples provided below, it should be evident from this description that multi-port segments 40,42 would be needed if any additional branches that might extend conducting elements within the plane or protrude out of the plane of the folded dipole.

Network analysis mathematically develops network functions from a series of interconnected ports from port transfer functions that relate the currents 44A, 44B, 44C, 44D entering/leaving a given port with the voltages 46A, 46B, 46C, 46D at that specific port through the impedance functions, Z(s)=V(s)/I(s), internal to that port. These well known techniques are used to construct multiple stage filters that have well-defined pass bands and varying bandwidths, as desired, at multiple center frequencies. Pass bands can be worked out mathematically by hand and bread-boarded. Alternatively, optimization software allows a user to define pass band characteristics at one or more center frequencies and the computer simulator will determine the optimal filtering component values to achieve a desired output for a given multi-stage filter architecture.

The following lumped circuit phasor expressions can be used to approximate impedance functions along a transmission line or among the components connected within a port when the physical size of the circuit/antenna element is much smaller than the electromagnetic wavelength of signals passing through the system and time delays between different portions of the circuits can be ignored.

$$V=j\omega LI \quad (2a)$$

$$I=j\omega CV \quad (2b)$$

$$V=IR \quad (2c)$$

In many instances that may not be the case, so the following distributed circuit equations are needed to have a more precise representation of functional performance within a port if the impedance transfer function is mathematically derived.

$$-(dV/dx)=(R+j\omega L)I \quad (3a)$$

$$-(dI/dx)=(G+j\omega C)V \quad (3b)$$

Reference is now made to FIGS. 5A-6B to illustrate how the filtering characteristics of a distributed network filter can be replicated within a single dipole antenna element by folding the dipole arms in a manner that reproduces the desired distributed reactance (inductive and capacitive loads) that produces the pass band characteristics of the multi-stage filter. This is accomplished by viewing the dipole antenna 100 as a transmission line having a signal feed 102 and a signal return line 104 that are each terminated by a capacitive load 106A,106B as shown in FIG. 5A. The arrows 108A and 108B symbolize the instantaneous current vectors of the signal feed 102 and the signal return 104. The capacitive loads 106A, 106B are characterized by the amount of charge that collects on the terminating surfaces of the antenna element as the radiating electromagnetic signal cycles. This simple transmission line structure is represented as a simple transmission line segment 110 (see FIG. 5B) that is terminated by the capacitive load 112. It is electrically characterized in FIG. 5C as a lumped circuit 120 with a transmission line, having series resistance 121 and inductance 122 from the wires' self-inductance and a parallel-connected (shunt) capacitance 124 and conductance 125 from capacitive coupling between the wires, that is terminated by the capacitive load 112.

Figure 5B:
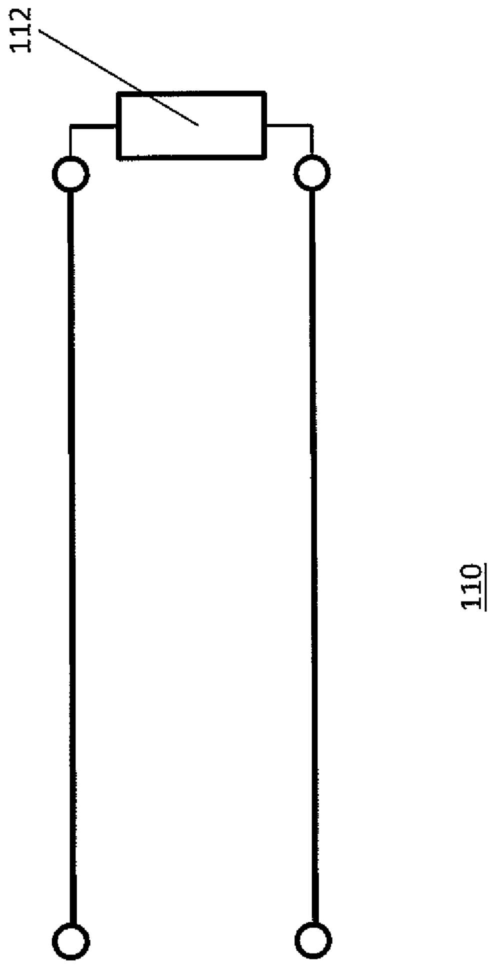
Figure 5C:
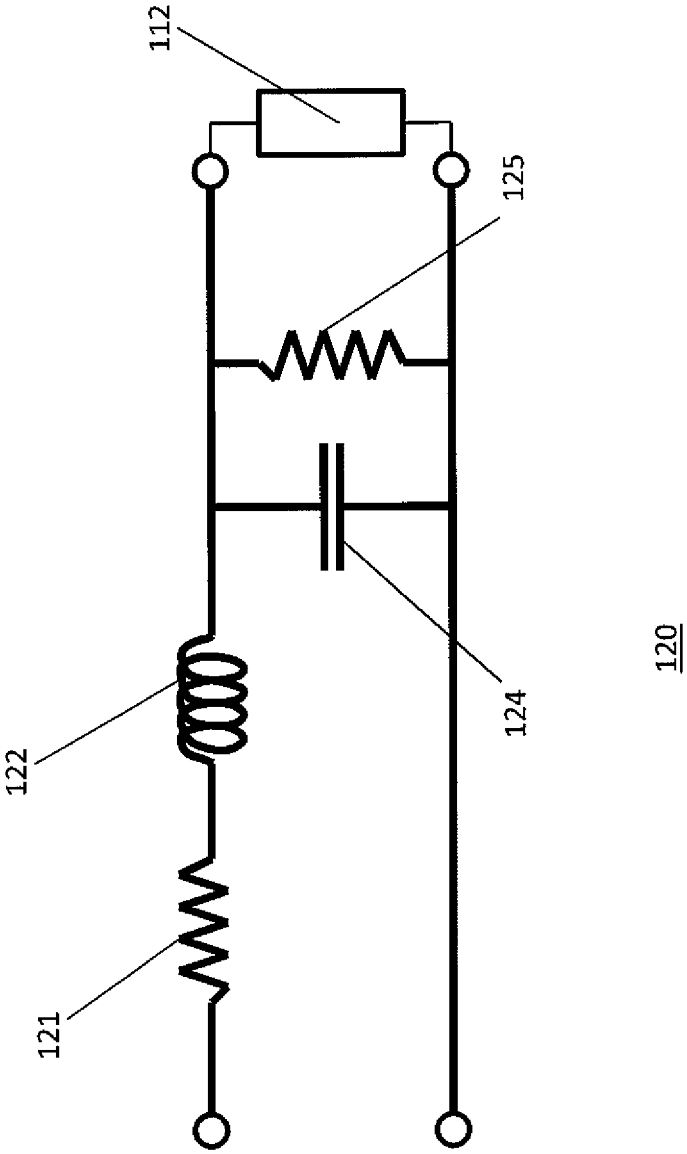

FIGS. 6A,B illustrates how folding the arms of a folded dipole antenna 200 modifies the simple transmission line structure of a conventional dipole shown in FIGS. 5A,5B,5C to distribute controllable levels of reactance either in series or in parallel at specific points within the circuit and, thereby, can be used to produce a distributed network filter, represented by equivalent circuit model 250, having pre-determined pass band characteristics. FIG. 6A depicts the co-linear alignment and distribution of instantaneous current vectors 201A,201B that electromagnetically excite the folded dipole antenna 200. When viewed as a distributed network, one arm is represented as the signal line 202A, while the other arm is the circuit's return line 202 B. As shown, the folds in the dipole arms create distributed reactance in coupled line segments internal to and between the dipole arms 202A,202B through parallel and anti-parallel co-linear current vector alignment over the coupled line segment. Although only three (3) reactive coupled line segments are highlighted in FIG. 6A, it should be understood that some of these coupled line segments may not be required by a given design objective, and that a plurality of coupled line segments may useful to other designs. Coupled line segments having parallel current vector alignment distribute inductive reactance over that length of the distributed network. Conversely, coupled line segments having anti-parallel current vector alignment contribute capacitive reactance over that length of the distributed network. Feed point reactance 203 has anti-parallel alignment and is generated by the coupled line segment spanning the antenna's physical feed point 204 and the first folds 205A, 205B in the dipole arms 202A,202B. Feed point reactance 203 is capacitive and non-radiative because the anti-parallel coupling cancels emissions over that region. As shown by the equivalent circuit model 250 depicted in FIG. 6B, the feed point reactance 203 contributes parallel capacitive reactance 252 because it is generated by anti-parallel current vector coupling between the dipole arms 202A,202B. Series capacitance 254 is added to the distributed network by introducing folds that produce line segment coupling with anti-parallel current vector alignment within the dipole arms 202A, 202B as shown in coupled line segments 206A,206B, respectively. Similarly, series inductance 256 is added to the distributed network by introducing folds that produce line segment coupling with parallel current vector alignment within the dipole arms 202A,202B as shown in coupled line segments 208A, 2088. Additional parallel reactance 258 is added to the distributed network by introducing folds that produce coupling between the dipole arms 202A,202B as shown in coupled line segment 210. Line segments that are either uncoupled or in parallel coupling with additional line segments are the radiating elements of a distributed network filter folded dipole antenna 200, and therefore contribute to the overall efficiency of the antenna when those line segments are resonantly excited. As is the case with the simple transmission line model depicted in FIGS. 5A,5B,5C, the equivalent circuit model of a distributed network filtering folded dipole antenna 200 is terminated by a capacitive load 112 determined by the cross-sectional geometry of the conductor element used to form the arms of antenna's signal 260A and return 260B lines. It should also be noted that the individual folds in the dipole arms 202A,202B will also contribute small series inductance, but it is not shown here for the purpose of clarity.

The coupling length 210 and coupling gap 212 determine the frequency-dependent value of the reactance by a coupled line segment introduced into the distributed network folded dipole antenna 200. A simplified equation for the capacitance (in Farads) generated by line segment coupling (anti-parallel current vector alignment) between two parallel round wire segments in the absence of a ground plane can be given by:

$$C=l\pi\epsilon_0\epsilon_r\ \ln(d/r) \tag{4}$$

where l is the coupling length, d is gap between the wires and r is the radius of the wire, all in meters, $\epsilon_0$ is the permittivity of free-space, and $\epsilon_r$ is the relative permittivity of the material separating the parallel wires.

An equation for the inductance in Henrys generated by inductive coupling between two parallel wire segments in the absence of a ground plane can be given by:

$$L_{pair}=\frac{\mu_o\mu_r l}{\pi}\left[\frac{d}{2r}+\sqrt{\frac{d^2}{4r^2}-1}\right] \tag{5}$$

where l is the coupling length, d is gap between the wires and r is the radius of the wire, all in meters, $\mu_0$ is the free-space permeability, and $\mu_r$ is the permeability of the material separating the parallel wires. The self-inductance of round wires in Henrys is given by:

$$L_{self}=\frac{\mu_o l}{2\pi}\left[\ln\left(\frac{l}{2r}+\sqrt{1+\frac{l^2}{4r^2}}\right)-\sqrt{1+\frac{l^2}{4r^2}}+\frac{2r}{l}+\frac{\mu_r}{4}\right] \tag{6}$$

where l is the wire length in meters, a is the wire diameter, $\mu_r$ is the relative permeability of the conducting material, and $\mu_0$ is the free-space permeability. Other equations would apply when the dipole arms do not comprise cylindrical wire. It should also be noted that any conducting wire shape can be used to form the folded dipole, however, the use of cylindrical wire in the folded dipole using the construction methods taught by de Rochemont '698 and '002 are preferred because of the stronger inductive coupling they provide.

Figure 1:
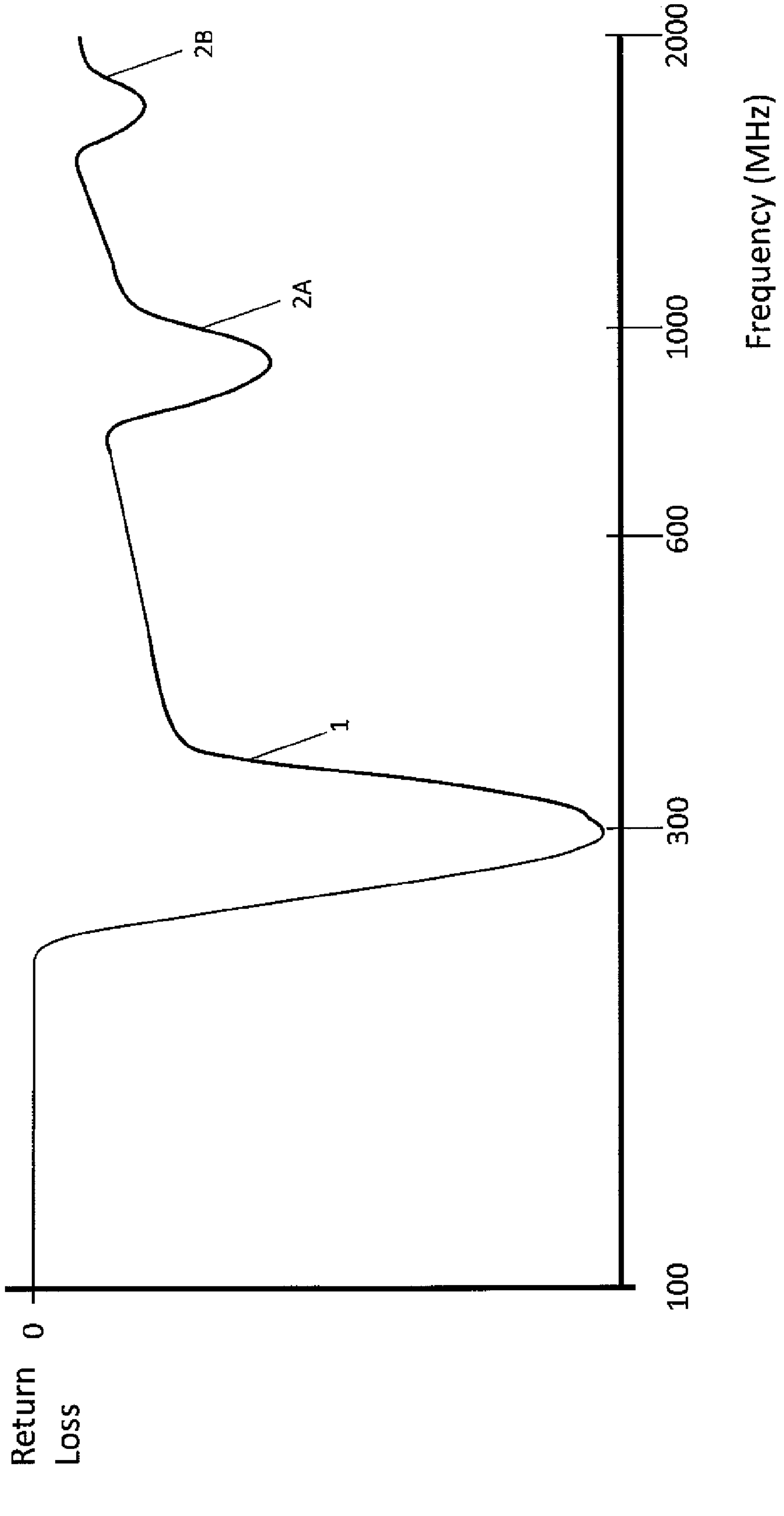
Prior Art FIG. 1
FIG. 1 depicts the resonance frequency (pass band) response of a dipole antenna element.
Figure 2A:
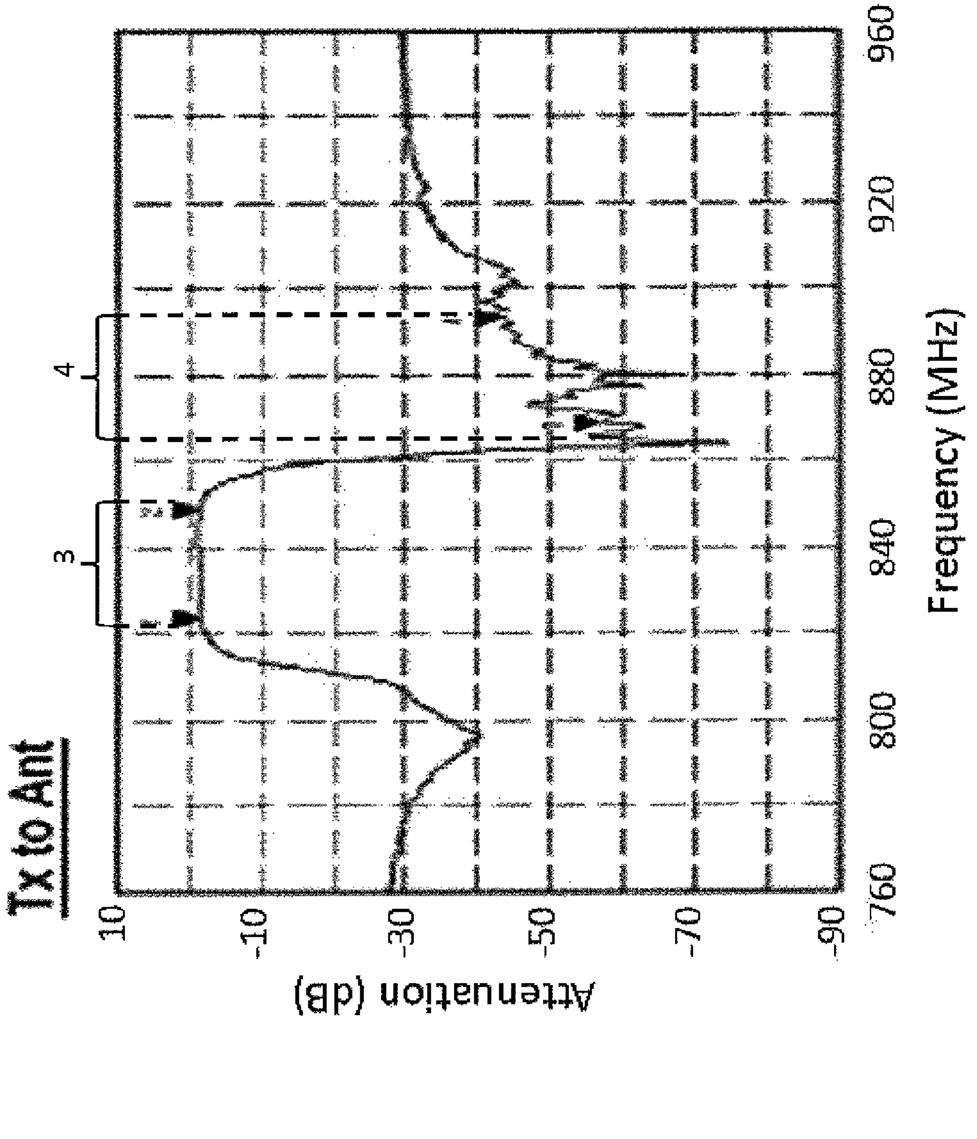
Prior Art FIG. 2A
FIGS. 2A,2B depict the pass bands of acoustic wave filters used to isolate uplink and downlink bands in a mobile wireless device.
Figure 2B:
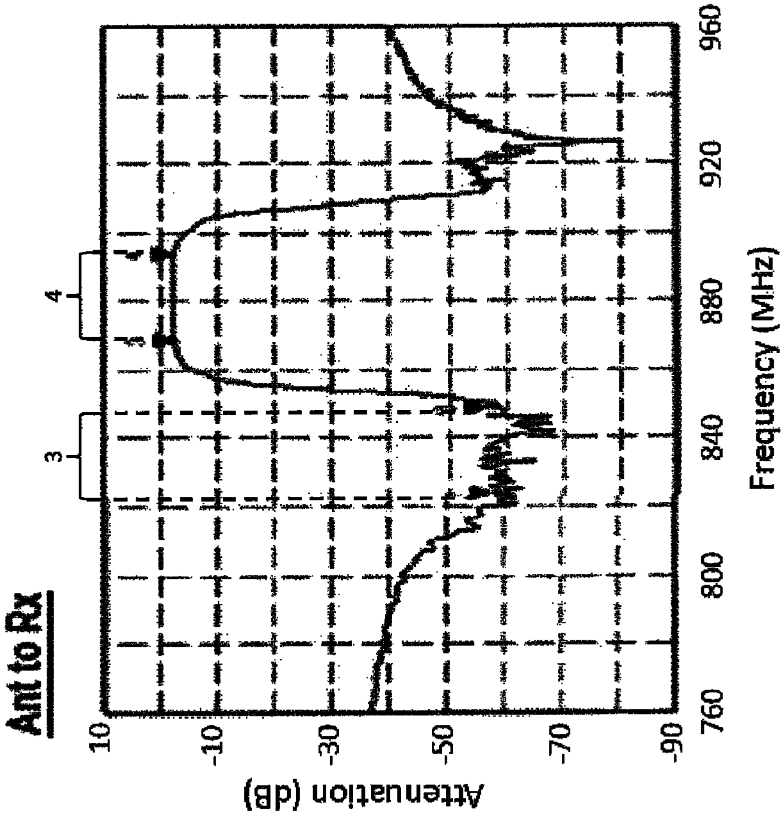
Prior Art FIG. 2B

It should be straightforward to anyone skilled in the art of network filter and antenna design that the ability to control the distributed reactance using the techniques described above permits the development of a more sophisticated multi-stage folded dipole antenna element that has multiple resonances with frequency-selective pass bands that are not limited to the characteristic resonant excitations of a fundamental frequency and its higher order harmonics as shown in FIG. 1. A specific embodiment of the invention (see FIG. 7) uses the techniques to design and construct a single dipole antenna element that is resonant over the major communications bands 300 used in a mobile device, such as the GSM 900/850 band 302, GPS band 1575.42 MHz 304, UMTS 1700 306, and WiFi 2400 MHz 308.

Reference is now made to FIGS. 8A, 8B, 8C, 8D to illustrate specific aspects of the invention that relate to high-efficiency narrow conductance band antennas with fixed tuning. When establishing wireless signal communications it is desirable to minimize losses between the transmitter and the receiver and maximizing signal-to-noise ("SNR") ratios. This is accomplished by enhancing the radiation efficiencies of the antenna elements and by minimizing the losses internal to the transmitter and the receiver. SNR is improved by blocking radio frequencies that do not carry useful signal information. Most filtering components contribute 1.5 dB to 3 dB of loss a piece. Therefore, it is desirable to develop methods to tune high efficiency antenna elements that are only sensitive to the electromagnetic frequencies used in an uplink or a downlink. The ability to use an antenna element as an uplink/downlink filtering system would enable considerable savings in component count, cost, occupied volume, and lost power in a mobile wireless transceiver. Table 3 shows the components that could be eliminated from a CMDA system and the direct power savings that would be achieved in the RF front-end alone by replacing the multi-component RF chain with a single antenna element. Greater power savings to the mobile device are realized since lower insertion losses in the path to the antenna would allow the power amplifier to be operated at a higher efficiency, so it consumes less power as well to produce the same RF power output.

large series inductance 343, a third intra-arm coupling stage 344 having high series capacitance 346 prior to the termination 348. Additional intra-arm and inter-arm stages could be added to improve the filtering characteristics, but are not shown here for clarity.

Figure 8A:
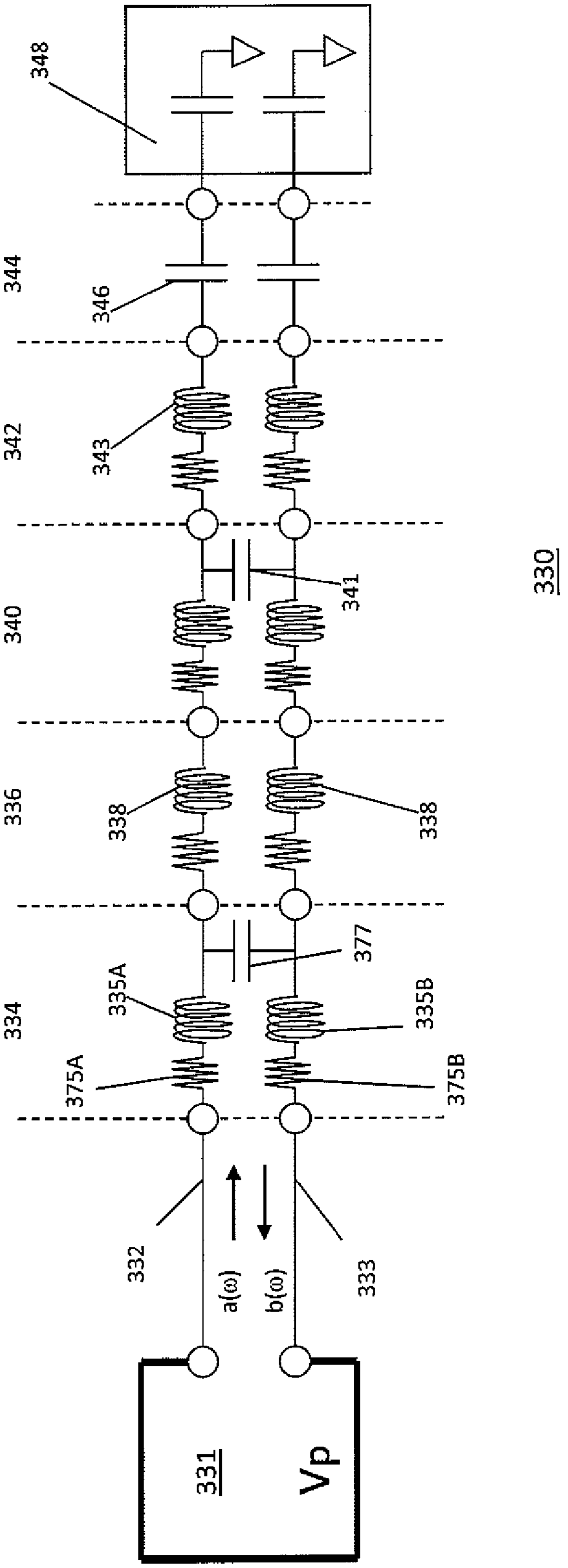
Figure 8B:
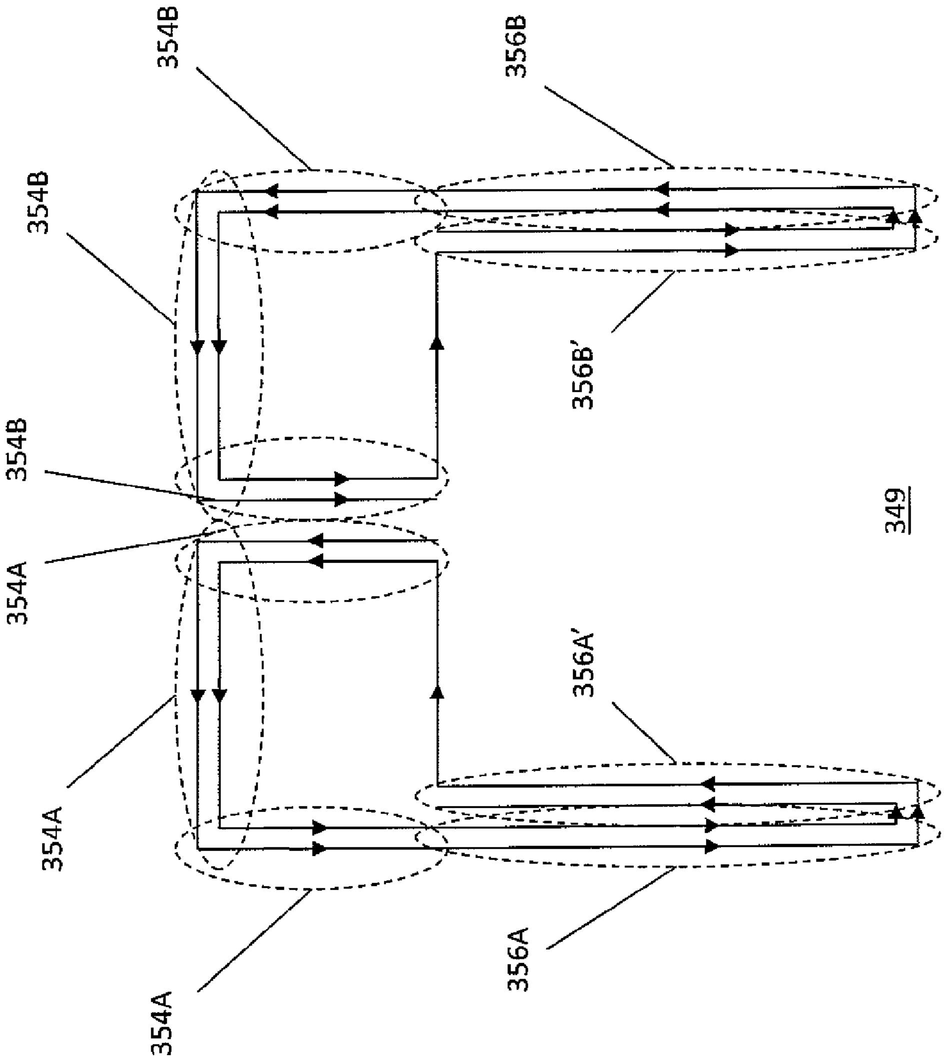
Figure 8C:
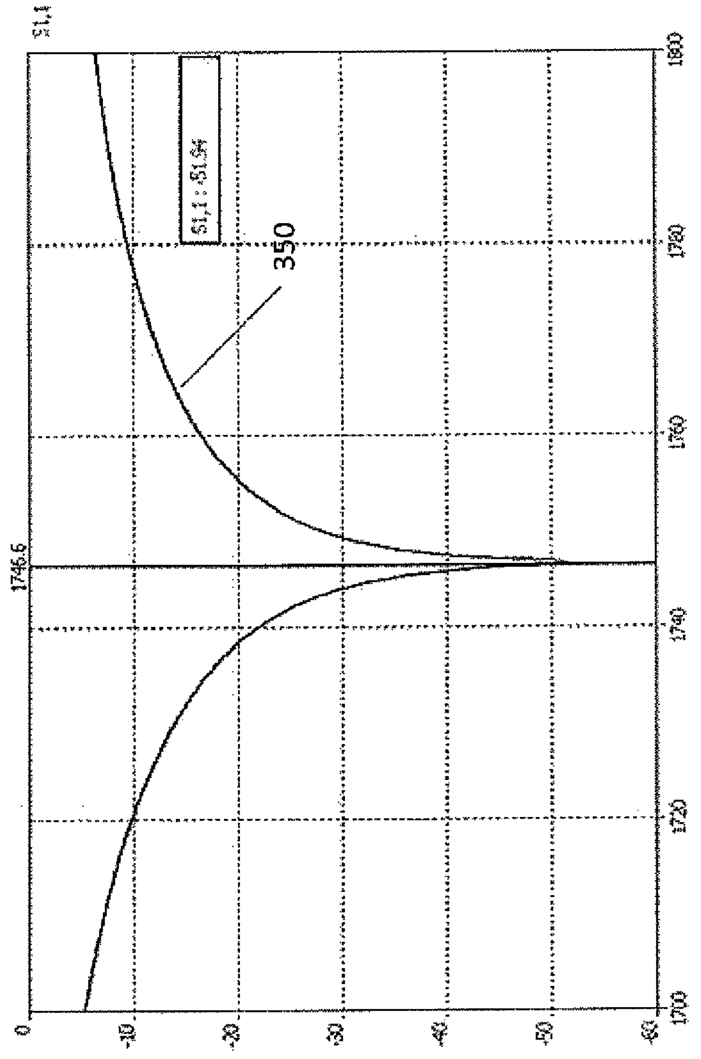
Figure 8D:
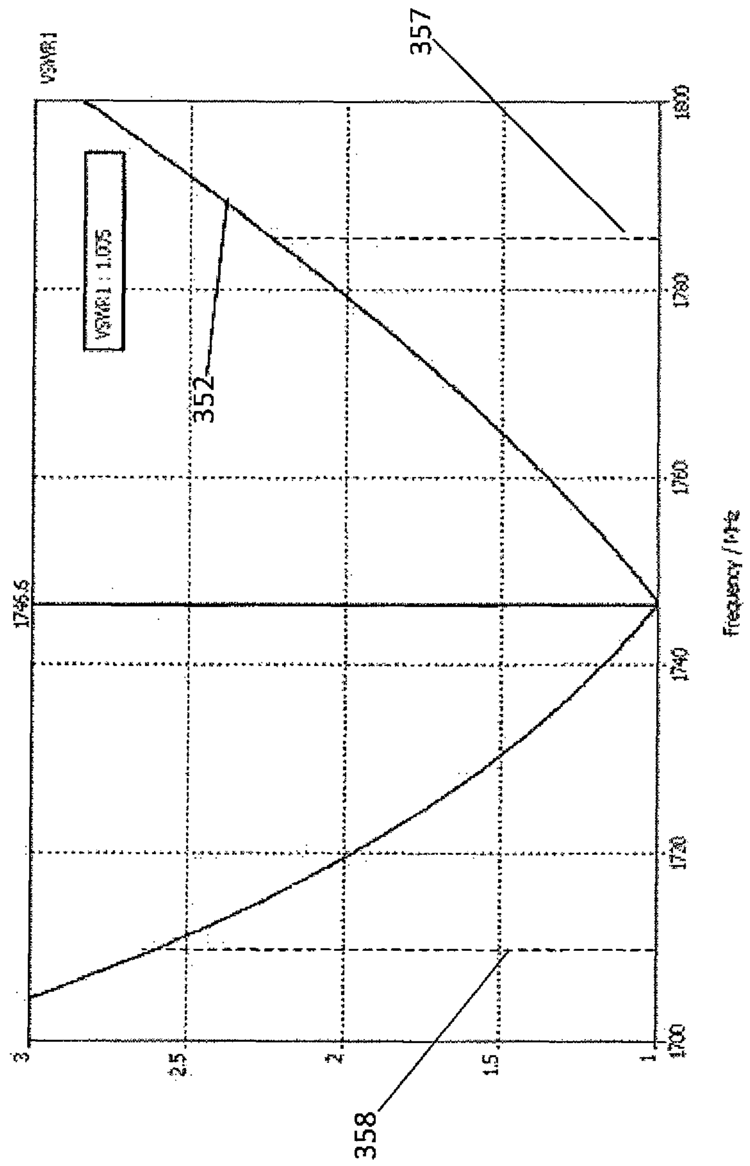

FIG. 8B is a schematic representation of a co-linear current vector alignment 349 for a folded dipole antenna that would distribute reactive loads in a manner consistent with the equivalent circuit distributed network filter 330. FIG. 8C is the narrow conductance band 350 exhibiting better than −40 dB signal isolation at the GSM 1800 uplink center frequency in the return loss of a folded dipole antenna element assembled to be consistent with vector alignment 331. FIG. 8D is the VSWR bandwidth 352 of the folded dipole antenna element assembled to consistent with vector alignment 349. A large serial inductance 338 in the folded dipole arms is needed to produce the desired VSWR and instantaneous bandwidth, which, in this instance, has VSWR values≤2.75 between the upper 357 and lower 358 frequencies of the GSM 1800 uplink band. The large serial inductance 338 is produced in a free-space antenna by having co-linear current vectors in parallel alignment over long length segments 354A,354B of the folded dipole arms. The narrow conductance band 350 is produced by inserting a high series capacitance 346 just prior to the antenna's termination 348. This high series capacitance 346 is produced by having multiple parallel current vector alignments 356A,356A' aligned in anti-parallel configuration with other multiple parallel current vector alignments 356B, 356B'. Multiple co-linear current vector alignment configurations can be used to achieve or improve upon these results. The configuration shown in FIG. 8B is utilized here to for its simplicity and clarity.

TABLE 3

Comparative Power Loss Analysis

| Component | Conventional CDMA RF Input Power | Conventional CDMA Power Lost | Conventional CDMA DC Input Power | Conventional CDMA Wasted Power | Narrow Band Antenna RF Input Power | Narrow Band Antenna Power Lost | Narrow Band Antenna DC Input Power | Narrow Band Antenna Wasted Power |
|---|---|---|---|---|---|---|---|---|
| Secondary Band filter | 1 mW | 1 mW | | 1 mW | 1 mW | — | | — |
| Power Amplifier (PA) | 1 mW | −506 mW | 1267 mW | 761 mW | 1 mW | −250 mW | 629 mW | 379 mW |
| PA/Duplexer matching | 507 mW | 23 mW | | 23 mW | | — | | — |
| SAW Duplexer | 484 mW | 212 mW | | 212 mW | | — | | — |
| Coupler | 272 mW | 6 mW | | 6 mW | | — | | — |
| Band Select Switch | 266 mW | 15 mW | | 15 mW | | — | | — |
| Power to Antenna | 251 mW | | | | 251 mW | — | | — |
| | | | | 1018 mW | | | | 379 mW |

The maintenance of high instantaneous bandwidth is a necessary property for high efficiency narrow conductance band antennas. To achieve this it is necessary to develop a network filter that provides a VSWR bandwidth that is substantially larger than the antenna conductance bandwidth and has a minimum value≤2.75 over the desired frequency range, but rises sharply outside the band edges. The wider VSWR bandwidth allows a quarter-wave transformer network to square off and sharpen the edges the antenna's conductance band as taught by de Rochemont '042, incorporated herein by way of reference. FIG. 8A depicts a representative equivalent circuit of a distributed network filter 330 that could be used, among others, to construct a narrow band antenna element. The equivalent circuit of the distributed network filter 330 consists of a power source 331 that excites the signal 332 and return 333 lines (dipole arms), a feed point stage 334, a first intra-arm coupling stage 336 having large series inductance 338, an inter-arm stage 340 having weak parallel capacitive coupling 341, a second intra-arm coupling stage 342 having Reference is now made to FIGS. 9 thru 13 to discuss additional embodiments of the invention. Although only free-space folded dipole antennas have been discussed so far, these models may not always reflect practical conditions for certain applications. Free-space antennas are idealized in the sense that the electromagnetic properties of their surrounding environment (vacuum) are stable. Also, a free-space antenna is not electromagnetically interacting with substances positioned in its surrounding environment. Both of these scenarios can compromise antenna performance, however, the associated constraints can be mitigated or overcome by embedding the filtering antenna element in an ultra-low loss meta-material dielectric body that has electromagnetic properties that remain stable with temperature. Therefore, a preferred embodiment (see FIG. 9A) of the invention assembles the folded dipole element 400 on a substrate surface 402 or within a low loss dielectric (not shown for clarity) or meta-material dielectric. In this embodiment LCD methods are applied to selectively deposit compositionally complex ceramic dielectric elements (inserted dielectric material) 404 within coupled line segments 406 the distributed network filter to further reline performance of the folded dipole antenna 408. LCD methods reliably integrate high dielectric density ($\in_R$,$\mu_R \geq 10$) dielectrics having properties that remain stable with varying temperature.

The application of LCD methods to antenna element assembly on a substrate, a substrate that contains an artificial ground plane, or within a meta-material dielectric body are discussed in de Rochemont '698, '002, and '159, which are incorporated herein by reference. The LCD process and the types of advanced materials it enables, including the manufacture of compositionally complex materials having a high dielectric density with properties that remain stable with temperature, are discussed in de Rochemont and Kovacs '112, which is incorporated herein by reference. The application of LCD methods to build fully integrated monolithic integrated circuitry and power management devices is discussed in de Rochemont '042 and '222, which are incorporated herein by reference.

As evidenced by equation 4, the relative permittivity ($\in_R$) of an inserted dielectric material 404 positioned in the gap of electromagnetically coupled line segments 406 within the folded dipole antenna formed between conductors carrying instantaneous currents having vectors anti-parallel alignment will proportionally increase the distributed capacitance of the coupled line segment. Similarly, as evidenced by equation 5, the relative permeability ($\mu_R$) of a material situated in the gap of coupled line segments within the folded dipole antenna formed between conductors carrying instantaneous currents having vectors in parallel alignment will proportionally increase the distributed inductance of the coupled line segment. The linear relationship between reactive loading and the relative dielectric strength ($\in_R$,$\mu_R$) of material inserted within gaps 406 between coupled line segments makes insertion of high density material into the folded dipole a reliable means to precisely tune the distributed reactance of a coupled line segment to achieve a specific filtering objective or to enhance radiation efficiency. This is only the case if the operational temperature of the antenna remains constant or the dielectric properties of the inserted dielectric material 404 are stable with varying temperature because any changes to the strength of the inserted dielectric material 404 will compromise performance characteristics by proportionally changing the reactance distributed within the coupled line segment. LCD alleviates these concerns through its ability to selectively deposit compositionally complex electroceramics that have atomic scale chemical uniformity and nanoscale microstructure controls. This enables the construction of distributed networks having reactive loads that meet critical performance tolerances by maintaining dielectric values within ≤±1% of design specifications over standard operating temperatures. The combination of atomic scale chemical uniformity and nanoscale microstructure are strictly required when inserting a high permittivity ($\in_R \geq 10$) electroceramics. As shown in FIG. 10, the dielectric constant of the barium strontium titanate ceramic remains stable over standard operating temperatures when its average grain size is less than 50 nanometer (nm) 420, but will vary by ±15% when the average grain size is 100 nm 421 and by ±40% when the average grain size is 200 nm 422. FIG. 11 depicts the initial permeability of a magnesium-copper-zinc-ferrite dielectric as a function of temperature for five different compositions, wherein the concentration of copper (Cu) is substituted for magnesium (Mg) according to the compositional formula $Mg_{(0.60-x)}Cu_{(x)}Zn_{(0.40)}Fe_2O_4$, with x=1 mol % 430, x=4 mol % 431, x=8 mol % 432, x=12 mol % 433, and x=14 mol % 434. Invariance in the permeability of magnetic materials is generally achieved in chemically complex compositions, and then only over narrow or specific compositional ranges, such as for x=1 mol % 430 and x=8 mol % 432 in the $Mg_{(0.60-x)}Cu_{(x)}Zn_{0.40)}Fe_2O_4$ system. Although permeability is a function of microstructure, grain size has a more pronounced effect on loss. However, the atomic scale compositional uniformity and precision of LCD methods is needed to maintain "critical tolerances" throughout the body of any high electromagnetic density magnetic material inserted into the folded dipole antenna 408 if it is to function as a reliable distributed network filter over standard operating temperatures.

Higher reactive loading may be desired for several reasons, including a need for achieving higher levels of distributed capacitive/inductance over a shorter line coupling length, a desire to extend the electrical length (shorten the physical length) of the filtering antenna element, or a desire to improve antenna radiation efficiency. High radiation efficiencies are achieved in folded dipole antennas that have reactive tunings that cause the distributed magnetic energy at resonance to occupy a surface area (or volume in 3-dimensional folded dipole configurations) that is equal to the surface area (or volume) of the distributed electrical energy at resonance. High radiation efficiencies are also achieved with reactive tunings that concentrate the resonant magnetic energy at the feed point and distribute the resonant electrical energy over the surface (or volume) of the folded dipole antenna. To achieve these conditions it is often necessary to vary the reactive tuning along the length of a coupled line segment 406. It is therefore a preferred embodiment of the invention to subdivide a coupled line segment 406 into a plurality of dielectric subdivisions 410A, 410B, 410C, 410D, 410E (shown in close up view in FIG. 9B) in which compositionally distinct dielectric materials are inserted along the length of the coupled line segment 406. Variable-length reactive tuning is often desirable when the folded dipole antenna is embedded in a meta-material dielectric comprising an ultra-low loss host dielectric (not shown for clarity in FIGS. 9A,9B) and at least one dielectric inclusion 412. The variable reactive tuning along length of the coupled line segment 406 is used to compensate or accommodate any reactive coupling between the folded dipole antenna 408 and the dielectric inclusion 412 of an optional meta-material dielectric (not shown in FIG. 9A).

Final embodiments of the invention relate to a tunable narrow conductance band antenna 500 which allows the center frequency 501 and pass band of such a high-Q filtering antenna to be shifted 502 up or down in frequency over a limited frequency range and its use in a mobile wireless device 550. (See FIGS. 11, 12 & 13). An RF front-end comprising a tunable narrow pass band antenna that adaptively reconfigures its filtering characteristics eliminates the need for a mobile wireless system to require multiple radio systems to navigate a fragmented communications frequency spectrum. Fixed frequency tunings require a mobile wireless device to have several radios, wherein each radio supports a dedicated communications band. In contrast, a mobile device having a wireless interface consisting of a tunable narrow conductance band antenna 500 would a allow a single radio to reconfigure itself for operation at a nearby frequency range, such as GSM 1800, GSM 1900, and UMTS 1700 IX, or GSM 900 and GSM 850 (see Table 1), thereby lowering the component count, cost, and occupied volume of the system.

While it would be possible to use a substance have variable dielectric properties as an inserted dielectric material 404 within the coupled line segments 406 of a folded dipole antenna 408, materials that have dielectric constants that can be varied in response to an applied stimulus generally have dielectric properties that are very sensitive to changes in temperature, which would complicate the antenna system by requiring temperature sensors and control loops to maintain stable filtering functions under normal operating conditions. Therefore, it is preferable to use LCD methods to integrate advanced dielectric materials that satisfy critical performance tolerances and use alternative means to alter the resonance properties of the folded dipole antenna. As noted above, the feed network 203 (FIG. 6A) is an integral element of the distributed network filter that can does not contribute to the radiation profile because its current vectors mutually cancel one another through anti-parallel alignment. However, as shown in FIG. 8A, the feed network 203 does form a stage 334 consisting of the distributed network filter 330 that contributes distributed reactance to the network in the form of resistive 375A,375S, capacitive 377 and series inductance 335A, 334B that can be altered to modulate the resonance characteristics of the network filter 330.

FIG. 14 illustrates a preferred configuration for the tunable narrow conductance band system 600 that consists of a folded dipole antenna 602 on an upper layer of a substrate 603. A folded dipole antenna 602, configured to operate as a narrow conductance band filter, has a tunable feed network 604 that is in electrical communication with the folded dipole antenna 602 through a via system 605 with inductor 606, resistor 608, and capacitor 610 elements located on a lower circuit layer 612 that may be the backside of the substrate 604 (not shown for clarity) or the surface of an additional substrate, which could comprise and an active semiconductor material. The inductor 606, resistor 608, and capacitor 610 elements are monolithically integrated onto the lower circuit layer 612 using LCD methods described in de Rochemont '159, '042 and '222, with a switching element 614 that allows the inductance, resistance, and capacitance of the inductor 606, resistor 608, and capacitor 610 elements to be varied in ways that shift the center frequency and pass bands of the folded dipole antenna 602 to retune its filtering pass band from one communications band to another communications band at an adjacent frequency. The inductor 606, resistor 608, and capacitor 610 elements on the lower circuit layer may comprise a plurality of individual passive elements configured as a lumped circuit in series and/or in parallel, with each lumped circuit being dedicated to a particular frequency output of the folded dipole antenna 602. Alternatively, the inductor 606, resistor 608, and capacitor 610 elements may be arranged in a manner that allows the switching element to vary the inductance of the inductor element 606 by modulating the number of turns that are actively used in the coil.

The methods and embodiments disclosed herein can be used to fabricate an antenna element that functions as a filtering network that is selectively tuned to have high-efficiency at specific resonant frequencies and to have pre-determined bandwidth at those resonant frequencies.

What is claimed:

1. A dipole antenna, comprising:

a selective frequency filter formed on and/or in a substrate by electrical dipole conductors folded to have distributed inductive and capacitive reactive loads between selected portions of one or more coupled line segments of the individual dipole conductors or between one dipole conductor to another, and one or more ceramic dielectric elements having precise dielectric permittivity and/or permeability formed on and/or in the substrate and located in proximity to the coupled line segments for determining an enhanced distributed reactance in the inductive and/or capacitive reactive loads.

2. The antenna of claim 1, wherein the dipole antenna is formed on and/or in a substrate.

3. The antenna of claim 1, wherein the ceramic dielectric elements have dielectric property that vary less than ±1% over temperatures between −40° C. and +125° C.

4. The antenna of claim 1, wherein the substrate is a low-loss meta-dielectric material consisting of amorphous silica.

5. The antenna of claim 1, wherein the dipole antenna forms a distributed network that filters a wireless communications band.

6. The antenna of claim 1, wherein the dipole antenna forms a distributed network that filters multiple communications bands.

7. A wireless device comprising the antenna of claim 1.

8. An antenna, comprising:

A substrate;

electrical conductors formed on and/or in the substrate; and one or more ceramic dielectric elements having relative permittivity $\in_R \geq 10$ and/or relative permeability $\mu_R \geq 10$ formed on and/or in the substrate between selected portions of the electrical conductors for determining a distributed reactance within the selected portions.

9. The antenna of claim 8, wherein the antenna is a dipole antenna.

10. The antenna of claim 9, wherein the electrical conductors of the dipole antenna are folded to form a distributed network filter.

11. A wireless device comprising the antenna of claim 8.

* * * * *